(12) United States Patent
Beeson et al.

(10) Patent No.: US 7,048,385 B2
(45) Date of Patent: *May 23, 2006

(54) PROJECTION DISPLAY SYSTEMS UTILIZING COLOR SCROLLING AND LIGHT EMITTING DIODES

(75) Inventors: Karl W. Beeson, Princeton, NJ (US); Scott M. Zimmerman, Baskin Ridge, NJ (US)

(73) Assignee: Goldeneye, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/869,290

(22) Filed: Jun. 16, 2004

(65) Prior Publication Data

US 2005/0280785 A1 Dec. 22, 2005

(51) Int. Cl.
G03B 21/00 (2006.01)
G03B 21/14 (2006.01)
G03B 21/28 (2006.01)
G02F 1/1335 (2006.01)
H04N 9/12 (2006.01)

(52) U.S. Cl. .............................. 353/97; 353/20; 353/31; 353/84; 353/98; 353/102; 349/5; 349/8; 349/9; 348/742; 348/743; 348/744; 313/113; 313/498; 362/247; 362/545

(58) Field of Classification Search .................. 353/20, 353/31, 33, 84, 97, 102, 98; 348/742, 743, 348/744; 349/5, 8, 9; 313/110, 113, 498; 362/247, 545
See application file for complete search history.

(56) References Cited

U.S. PATENT DOCUMENTS

| 6,144,536 A | 11/2000 | Zimmerman et al. ......... 361/31 |
|---|---|---|
| 6,185,357 B1 | 2/2001 | Zou et al. ................... 385/133 |
| 6,186,649 B1 | 2/2001 | Zou et al. ................... 362/347 |
| 6,356,700 B1 * | 3/2002 | Strobl ........................ 385/147 |
| 6,410,454 B1 | 6/2002 | Muranaka et al. ............. 362/31 |
| 6,417,019 B1 | 7/2002 | Mueller et al. ............... 438/29 |
| 6,550,942 B1 | 4/2003 | Zou et al. ................... 362/347 |
| 6,576,930 B1 | 6/2003 | Reeh et al. .................... 257/98 |
| 6,730,940 B1 | 5/2004 | Steranka et al. .............. 257/98 |
| 6,739,723 B1 * | 5/2004 | Haven et al. ................. 353/20 |
| 6,771,325 B1 * | 8/2004 | Dewald et al. ............. 348/743 |
| 6,851,811 B1 * | 2/2005 | Akiyama ..................... 353/31 |
| 2004/0232812 A1 * | 11/2004 | Beeson et al. .............. 313/110 |

OTHER PUBLICATIONS

Ryer, Alex, Light Measurement Handbook, 1997, p. 32, International Light, Inc., Newburyport, Massachusetts, USA.

* cited by examiner

Primary Examiner—Melissa Jan Koval
(74) Attorney, Agent, or Firm—William Propp, Esq.

(57) ABSTRACT

A projection display system has at least one light-recycling illumination system, a color scroller and an imaging light modulator. The light-recycling illumination system includes a light source that is enclosed within a light-recycling envelope. The light source is a light-emitting diode that emits light, and a fraction of that light will exit the light-recycling envelope through an aperture. The light-recycling envelope recycles a portion of the light emitted by the light source back to the light source in order to enhance the luminance of the light exiting the aperture. The fraction of the light that exits the aperture is partially collimated and is directed to a color scrolling means. The color scroller scans the partially collimated light across the face of the imaging light modulator. The imaging light modulator spatially modulates the scrolled beam of light to form an image.

14 Claims, 15 Drawing Sheets

PROJECTION DISPLAY SYSTEMS UTILIZING COLOR SCROLLING AND LIGHT EMITTING DIODES

CROSS REFERENCES TO RELATED APPLICATIONS

This application is related to U.S. patent application Ser. No. 10/445,136 entitled "ILLUMINATION SYSTEMS UTILIZING HIGHLY REFLECTIVE LIGHT EMITTING DIODES AND LIGHT RECYCLING TO ENHANCE BRIGHTNESS," which is herein incorporated by reference. This application is also related to U.S. patent application Ser. No. 10/814,043 entitled "ILLUMINATION SYSTEMS UTILIZING LIGHT EMITTING DIODES AND LIGHT RECYCLING TO ENHANCE OUTPUT RADIANCE," to U.S. patent application Ser. No. 10/814,044 entitled "ILLUMINATION SYSTEMS UTILIZING MULTIPLE WAVELENGTH LIGHT RECYCLING" and to U.S. patent application Ser. No. 10/815,005 entitled "PROJECTION DISPLAY SYSTEMS UTILIZING LIGHT EMITTING DIODES AND LIGHT RECYCLING," all of which are herein incorporated by reference.

TECHNICAL FIELD

This invention relates to projection display systems incorporating color scrolling and light-emitting diodes (LEDs).

BACKGROUND OF THE INVENTION

Applications such as projection display systems, including color scrolling projection display systems, require light sources with high brightness and a small effective emitting area. An example of a conventional light source with high brightness and a small effective emitting area is an arc lamp source, such as a xenon arc lamp or a mercury arc lamp. Arc lamp sources may have emitting areas as small as a few square millimeters.

Current projection display systems typically project the combined images of three small red, green and blue cathode-ray-tube (CRT) devices onto a viewing screen using projection lenses. More recent designs sometimes use a small-area arc lamp as the light source. In the newer systems, spatially modulated images formed on one or more imaging light modulators are projected onto a viewing screen. Imaging light modulators can include, for example, liquid crystal display (LCD) devices, liquid-crystal-on-silicon (LCOS) devices or digital light processor (DLP) devices. DLP devices utilize an array of micro-mirrors to form an image. Light sources such as LEDs are currently not used for projection display systems because LED sources do not have sufficient output brightness.

The technical term brightness can be defined either in radiometric units or photometric units. In the radiometric system of units, the unit of light flux or radiant flux is expressed in watts and the unit for brightness is called radiance, which is defined as watts per square meter per steradian (where steradian is the unit of solid angle). The human eye, however, is more sensitive to some wavelengths of light (for example, green light) than it is to other wavelengths (for example, blue or red light). The photometric system is designed to take the human eye response into account and therefore brightness in the photometric system is brightness as observed by the human eye. In the photometric system, the unit of light flux as perceived by the human eye is called luminous flux and is expressed in units of lumens. The unit for brightness is called luminance, which is defined as lumens per square meter per steradian. The human eye is only sensitive to light in the wavelength range from approximately 400 nanometers to approximately 700 nanometers. Light having wavelengths less than about 400 nanometers or greater than about 700 nanometers has zero luminance, irrespective of the radiance values.

In U.S. patent application Ser. No. 10/445,136, brightness enhancement referred to luminance enhancement only. Since luminance is non-zero only for the visible wavelength range of approximately 400 to 700 nanometers, U.S. patent application Ser. No. 10/445,136 is operative only in the 400- to 700-nanometer wavelength range visible to the human eye. In U.S. patent application Ser. No. 10/814,043 entitled "ILLUMINATION SYSTEMS UTILIZING LIGHT EMITTING DIODES AND LIGHT RECYCLING TO ENHANCE OUTPUT RADIANCE," brightness enhancement refers to radiance enhancement and is valid for any wavelength throughout the optical spectrum. In this application, brightness enhancement will generally refer to luminance enhancement.

In a conventional imaging optical system that transports light in one direction from an input source at one location to an output image at a second location, one cannot produce an optical output image whose luminance is higher than the luminance of the light source. Luminance is measured in units of candela per square meter, where a candela is a lumen per steradian. In a text entitled "Light Measurement Handbook" 1997 ISBN 0-9658356-9-3, A. Ryer states: "The biggest source of confusion regarding intensity measurements involves the difference between mean spherical candela and beam candela, both of which use the candela unit (lumens per steradian). Mean spherical measurements are made in an integrating sphere, and represent the total output in lumens divided by $4\pi$ steradians in a sphere. Thus a one candela isotropic lamp produces one lumen per steradian. Beam candela, on the other hand, samples a very narrow angle and is only representative of the lumens per steradian at the peak intensity of the beam. This measurement is frequently misleading, since the sampling angle need not be defined. Suppose that two LED's each emit 0.1 lumen total in a narrow beam: One has a 10 degree solid angle and the other a 5 degree solid angle. The 10 degree LED has an intensity of 4.2 candelas and the 5 degree LED an intensity of 16.7 candelas." By measuring the intensity within the central cone of the beam, one LED is four times brighter than the other even though they both output the same amount of light. However the mean spherical candela of both LED's would be identical.

In U.S. Pat. No. 6,144,536, herein incorporated by reference, Zimmerman et al demonstrate that beam candela can be enhanced (luminance is enhanced over a narrower solid angle compared to the emitting angle of the source). However, to construct a high intensity LED light source for use in projection displays requires producing an output luminance in mean spherical candela that is greater than the intrinsic mean spherical candela luminance of a single LED. U.S. Pat. No. 6,144,536 does not teach how to do this.

The method described in U.S. Pat. No. 6,144,536 is directed at using extended linear light sources edge coupled to a large area waveguide containing an extraction and collimating means used, as an example, for a backlight in a flat panel display. Light from these extended linear sources is coupled into the edge of the waveguide, and then extracted off the top surface of the waveguide using an extraction means which purposefully limits the output angular distribution (solid angle). Narrowing the output angular distribution is required by U.S. Pat. No. 6,144,536 in order to achieve any useful luminance enhancement. The method and apparatus taught by U.S. Pat. No. 6,144,536 does not produce the combination of high brightness (luminance) and high flux (total lumens) within an output area sufficiently small enough for projection displays or other concentrated high intensity light source applications. The linear light sources described in U.S. Pat. No. 6,144,536 are effective at edge coupling into extended area waveguides and are used in many backlighting applications. The linear light sources are not effective in coupling into small output areas due to the extended nature of the sources.

LEDs offer several advantages as high intensity light sources such as long life, color purity, large dimming range, and lack of infrared or ultraviolet radiation. Unfortunately, even the very high brightness LEDs that have recently been developed lack both the total lumens and the luminance necessary to be used in projection and many high intensity light source applications. In order to meet this market need, either the present LEDs must improve both luminance and total flux out, or a method must be developed whereby the output of multiple LEDs can be combined efficiently to increase the luminance within a small output area. Typically, present day high brightness LEDs can output 120 lumens from an area of 4 mm$^2$ with a substantially Lambertian output. Peak intensities of almost four mega candelas are typically quoted in the literature for these devices. While this performance is much improved over previous LEDs, they are still well below the levels created by the light sources used in projection and high intensity illumination systems. As an example, a typical projection system will use a high intensity discharge (HID) lamp having an effective arc area of 6 mm$^2$ generating several thousand lumens of light and a luminance more than 10 times higher than current state of the art LEDs. In order for an LED based source to compete with these HID sources, an output of nearly a thousand lumens and a luminance many times higher than the individual LEDs must be emitted through an output area of few square millimeters.

U.S. Pat. No. 6,144,536 describes light recycling means in conjunction with reflective LEDs. However, the method taught will not provide a brightness enhancement independent of direction (mean spherical intensity). U.S. Pat. No. 6,144,536 does not teach how one may enhance the brightness of an LED light source such that the output has a luminance and flux that are higher than any one of the LED light sources used as an input. U.S. Pat. No. 6,144,536 requires a light extracting means in optical contact with light transmitting means and a light output surface through which the extracted light is directed to achieve an enhanced output luminance. These multiple optical elements alter and narrow the angular distribution of the light collected from the light sources. Therefore, the brightness enhancement is achieved largely through the reduction in the output angle of the emitted beam. As the brightness (luminance) is defined as the flux divided by the area and the solid angle of the beam, narrowing the solid angle increases the brightness only within the narrow angular range. However, narrowing the solid angle does not increase the total flux (lumens). Therefore, the optical illumination system described in U.S. Pat. No. 6,144,536 produces an average output luminance over a ±90° angular range that is less than the average input luminance (measured over a ±90° angular range) emitted from the same size area as an input LED. In addition, the light extraction means and the light transmitting means required by U.S. Pat. No. 6,144,536 are additional cumbersome elements that add extra expense and complication to fabricating a small area emitting light source. For a useful small area light source, one needs to enhance not only the brightness (luminance) but also the total output lumens. For example, it would be beneficial to construct a light source that has the same small emitting area as one LED but with higher average luminance and higher output lumens than produced by a single LED. Furthermore, it would be very beneficial if a method could be found to construct an enhanced luminance LED based light source with fewer optical elements than required by U.S. Pat. No. 6,144,536, eliminating the need for a light transmitting means and a light extraction means.

Recently, highly reflective green, cyan, blue and ultraviolet LEDs and diode lasers based on gallium nitride (GaN), indium gallium nitride (InGaN), aluminum gallium nitride (AlGaN) and aluminum nitride (AlN) semiconductor materials have been developed. Some of these LED devices have high light output, high luminance and have a reflecting layer that can reflect at least 50% of the light incident upon the device. Such a reflecting layer is necessary in order to increase the effective luminance of the LED by light recycling. The reflecting layer of the LED can be a specular reflector or a diffuse reflector. Typically, the reflecting layer of the LED is a specular reflector. Luminance outputs of several million lumens per square meter per steradian and total outputs greater than 100 lumens from a single packaged device are possible. Light outputs per unit area can exceed 25 lumens per square millimeter. As such, several new applications relating to illumination systems have become possible. Advantages such as spectral purity, reduced heat, and fast switching speed all provide motivation to use LEDs to replace fluorescent, incandescent and arc lamp sources.

Red and yellow LEDs were developed earlier than the UV, blue, cyan and green LEDs. The red and yellow LEDs are generally made from a different set of semiconductor materials, one particular example being aluminum indium gallium phosphide (AlInGaP).

FIG. 1 illustrates a cross-sectional view of a recently developed type of LED 10 that has an emitting layer 16 located below both a transparent top electrode 13 and a second transparent layer 14. Emitting layer 16 emits light rays 15 when an electric current is passed through the device 10. Below the emitting layer 16 is a reflecting layer 17 that also serves as a portion of the bottom electrode. Electrical contacts 11 and 12 provide a pathway for electrical current to flow through the device 10. It is a recent new concept to have both electrical contacts 11 and 12 on the backside of the LED opposite the emitting surface. Typical prior LED designs placed one electrode on top of the device, which interfered with the light output from the top surface and resulted in devices with low reflectivity. The reflecting layer 17 allows the LED to be both a light emitter and a light reflector. Lumileds Lighting LLC, for example, produces highly reflective green, blue and ultraviolet LED devices of this type. It is expected that highly reflective yellow, red and infrared LEDs with high outputs and high luminance will also eventually be developed. However, even the new green, cyan, blue and ultraviolet gallium nitride, indium gallium nitride, aluminum gallium nitride and aluminum nitride LEDs do not have sufficient luminance for many applications.

Most light-emitting color projection displays utilize three primary colors to form full-color images. The three primary colors are normally red (R), green (G) and blue (B), but some projection displays may also utilize additional colors such as white (W), yellow (Y), cyan (C) and magenta (M). The red, green and blue primary colors can be mixed to form thousands or millions of colors and color grayscale levels. The total number of mixed colors and color grayscale levels that can be produced by the display depends on the number of intensity levels that can be produced for each R, G and B color. If the display can produce, for example, 100 intensity levels (grayscale levels) of R and 100 intensity levels (grayscale levels) of G, then R and G can be mixed 100×100 or 10,000 ways to produce many different colors and many different grayscale levels of particular colors. When R and G are mixed, the resulting color depends on the ratio of R to G. The grayscale level of the mixed color depends on the intensity level of the mixture. As an illustrative example, mixing intensity level 100 of the color R and intensity level 100 of the color G can produce the color yellow. The ratio of intensity level R to intensity level G is 100:100 or 1:1. Mixing intensity level 50 of the color R and intensity level 50 of the color G will produce the same yellow color since the ratio of the two intensity levels is still 1:1. However, the intensity or grayscale level of the 50:50 mixture is one-half of the intensity or grayscale level of the 100:100 mixture. Adding a third primary color B increases the number of possible colors. In this example, if the total number of intensity or grayscale levels of B is 100, then R, G and B can be mixed 100×100×100 or 1,000,000 ways to achieve a wide range of colors and multiple grayscale levels of the same color. The colors that are called white are mixtures of R, G and B.

Prior art color scrolling projection display systems have been developed using arc lamp light sources. Projection display systems that utilize color scrolling require only one imaging light modulator to form full color images. In one type of color scrolling system, a set of dichroic mirrors separates the white light emitted by the arc lamp source into red, green and blue components. The red, green and blue components are separately formed into bands of light that are sequentially scanned (scrolled) across an imaging light modulator using a set of rotating prisms. Dark areas between the colored bands allow the imaging light modulator to be readdressed with the correct information to form an image utilizing the subsequently scrolled, colored band. In another type of color scrolling projection display system, a rotating color filter wheel consisting of a set of color filters does the scanning function.

Color scrolling projection display systems that use arc lamp light sources have several drawbacks. First, arc lamp sources have useful lifetimes that are typically shorter than the lifetime of the projection display system. Lamp replacement, a costly and inconvenient process, is sometimes required. The replacement lamps must be carefully aligned in order for the projection system to function properly. Second, arc lamp sources may contain environmentally toxic materials such as mercury. Third, color scrolling projection display systems that utilize arc lamps cannot be conveniently adjusted to change the color temperature or color balance of the light source.

The color balance of the light source output is the ratio of the primary colors (for example, red, green and blue) measured in lumens. Combining the primary colors produces a "white" color that can be compared to the color of the "white" light emitted from a blackbody radiator that is held at a particular temperature (the color temperature). Light sources with a high color temperature appear to be somewhat blue in appearance. Light sources with a low color temperature appear to be somewhat red because they emit less blue light and more red light than a high color temperature source. The color temperature of an arc lamp source is determined by the properties of the arc and cannot be easily adjusted. However, an LED-based light source contains, for example, separate red, green and blue LEDs that can be separately adjusted to affect the color balance and color temperature.

It would be highly desirable to develop LED-based projection display systems that utilize color scrolling and light recycling in order to increase the maximum output luminance of the systems. It would also be desirable to use LEDs to control the color balance and color temperature of such projection display systems. Possible uses include projection displays for television, advertising and avionics applications.

SUMMARY OF THE INVENTION

This invention is a projection display system that comprises at least one light-recycling illumination system, a color scrolling means and an imaging light modulator. The light-recycling illumination system further comprises a light source for generating light, a light-recycling envelope, a light-output aperture and a light-collimating means. The light source is at least one light-emitting diode having a reflecting layer, wherein the total light-emitting area of the light source is area $A_S$ and wherein the light source has a maximum intrinsic source luminance. The light-recycling envelope encloses the light source and reflects and recycles a portion of the light generated by the light source back to the reflecting layer of the at least one light-emitting diode. The light-output aperture is located in a surface of the light-recycling envelope and has area $A_O$, wherein area $A_O$ is less than area $A_S$. The light source and the light-recycling envelope direct at least a fraction of the light out of the light-recycling envelope through the light-output aperture as uncollimated light having a maximum exiting luminance. Under some conditions, the maximum exiting luminance is greater than the maximum intrinsic source luminance. The light-collimating means has an input surface that is adjacent to the light-output aperture and that accepts the uncollimated light. The light-collimating means partially collimates the uncollimated light and directs the partially collimating light through an output surface and to a color scrolling means. The color scrolling means sequentially scans bands of red, green and blue light across the face of an imaging light modulator. The imaging light modulator, which is located in the optical path following the color scrolling means, spatially modulates the scrolled light to form an image. The image is projected onto a viewing screen.

BRIEF DESCRIPTION OF THE DRAWINGS

A more complete understanding of the present invention, as well as other objects and advantages thereof not enumerated herein, will become apparent upon consideration of the following detailed description and accompanying drawings, wherein.

DETAILED DESCRIPTION OF THE PREFERRED EMBODIMENTS

Figure 1:
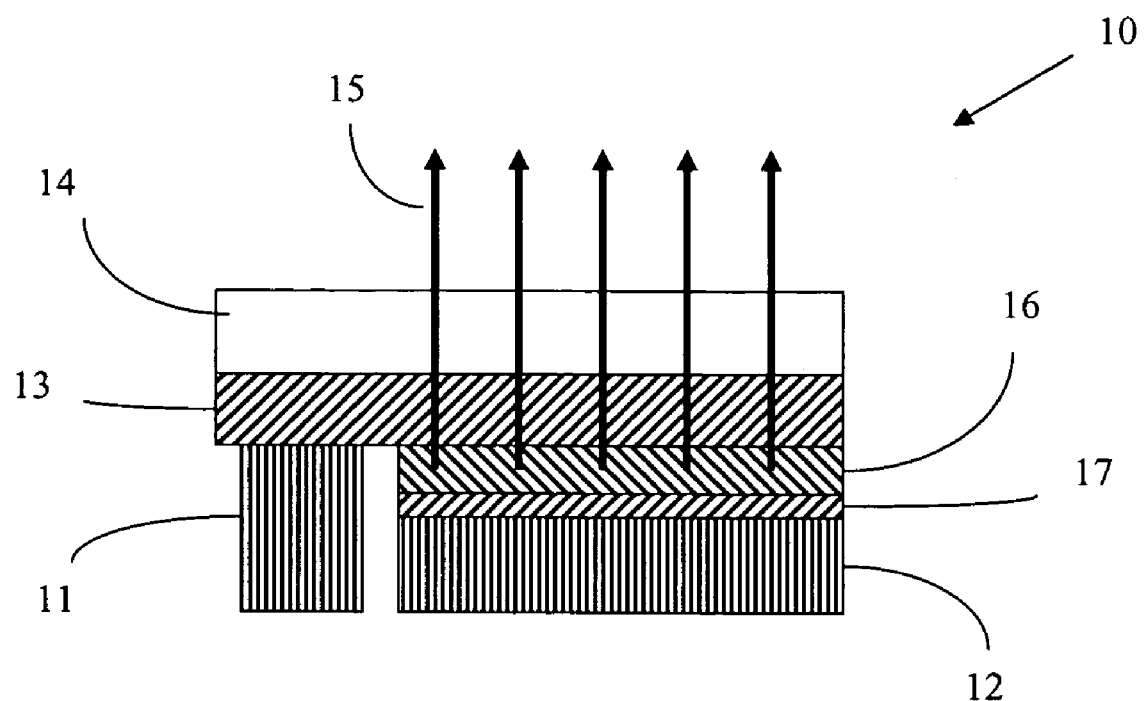
FIG. 1 is a cross-sectional view of a prior art light source that has both emitting and reflecting surfaces.

The preferred embodiments of the present invention will be better understood by those skilled in the art by reference to the above figures. The preferred embodiments of this invention illustrated in the figures are not intended to be exhaustive or to limit the invention to the precise form disclosed. The figures are chosen to describe or to best explain the principles of the invention and its applicable and practical use to thereby enable others skilled in the art to best utilize the invention.

The embodiments of this invention are comprised of at least one illumination system, a color scrolling means and an imaging light modulator. The illumination system is further comprised of a light source, a light-recycling envelope, a light-output aperture located in the surface of the light-recycling envelope and a light-collimating means.

The preferred light source of this invention comprises at least one light-emitting diode (LED). Preferred LEDs are inorganic light-emitting diodes and organic light-emitting diodes (OLEDs) that both emit light and reflect light. More preferred LEDs are inorganic light-emitting diodes due to their higher light output brightness.

Various illumination systems that utilize LEDs are illustrated in FIGS. 2–5 and 7–8. An LED depicted in FIGS. 2–5 and 7–8 may be any LED that both emits light and reflects light. Examples of LEDs that both emit and reflect light include inorganic light-emitting diodes and OLEDs. Inorganic light-emitting diodes can be fabricated from materials containing gallium nitride, aluminum gallium nitride, indium gallium nitride, aluminum nitride, aluminum indium gallium phosphide, gallium arsenide, indium gallium arsenide or indium gallium arsenide phosphide, for example, but are not limited to such materials. OLEDs may be constructed from a variety of light-emitting organic small molecules or polymers. Appropriate small molecules include, for example, tris (8-hydroxyquinoline) aluminum (III), which can be abbreviated as $Alq_3$, and certain types of chelates, oxadiazoles, imidazoles, benzidines and triarylamines, but are not limited to such materials. Appropriate polymers include, for example, poly(ethylene dioxythiophene) and poly(styrene sulfonate).

For purposes of simplifying the figures, each LED in FIGS. 2–5 and 7–8 is illustrated in an identical manner and each LED is shown as being comprised of two elements, an emitting layer that emits light and a reflecting layer that reflects light. Note that typical LEDs are normally constructed with more than two elements, but for the purposes of simplifying the figures, the additional elements are not shown. Some of the embodiments of this invention may contain two or more LEDs. Although each LED in FIGS. 2–5 and 7–8 is illustrated in an identical manner, it is within the scope of this invention that multiple LEDs in an embodiment may not all be identical. For example, if an embodiment of this invention has a plurality of LEDs, it is within the scope of this invention that some of the LEDs may be inorganic light-emitting diodes and some of the LEDs may be OLEDs. As a further example of an illumination system having multiple LEDs, if an embodiment of this invention has a plurality of LEDs, it is also within the scope of this invention that some of the LEDs may emit different colors of light. Example LED colors include, but are not limited to, wavelengths in the infrared, visible and ultraviolet regions of the optical spectrum. For example, one or more of the LEDs in a light-recycling envelope may emit red light, one or more of the LEDs may emit green light and one or more of the LEDs may emit blue light. If an embodiment, for example, contains LEDs that emit red, green and blue light, then the red, green and blue colors may be emitted concurrently to produce a single composite output color such as white light.

Preferred LEDs have at least one reflecting layer that reflects light incident upon the LED. The reflecting layer of the LED may be either a specular reflector or a diffuse reflector. Typically, the reflecting layer is a specular reflector. Preferably the reflectivity $R_S$ of the reflecting layer of the LED is at least 50%. More preferably, the reflectivity $R_S$ is at least 70%. Most preferably, the reflectivity $R_S$ is at least 90%.

Each LED in FIGS. 2–5 and 7–8 is illustrated with an emitting layer facing the interior of the light-recycling envelope and a reflecting layer positioned behind the emitting layer and adjacent to the inside surface of the light-recycling envelope. In this configuration, light can be emitted from all surfaces of the emitting layer that are not in contact with the reflecting layer. It is also within the scope of this invention that a second reflecting layer can be placed on a portion of the surface of the emitting layer facing the interior of the light-recycling envelope. In the latter example, light can be emitted from the surfaces of the emitting layer that do not contact either reflecting layer. A second reflecting layer is especially important for some types of LEDs that have an electrical connection on the top surface of the emitting layer since the second reflecting layer can improve the overall reflectivity of the LED.

The total light-emitting area of the light source is area $A_S$. If there is more than one LED within a single light-recycling envelope, the total light-emitting area $A_S$ of the light source is the total light-emitting area of all the LEDs in the light-recycling envelope.

A light source, whether comprising one LED or a plurality of LEDs, has a maximum intrinsic source luminance that depends on the light source design and the driving electrical power applied to the light source. The maximum intrinsic source luminance is determined in the following manner. First, the luminance is measured for each LED in the light source when the light-recycling envelope is not present and when no other LED is directing light to the LED under measurement. The measurements are done with each LED powered at the same level as in the illumination system and are done as a function of emitting angle. From these luminance measurements, a maximum luminance value can be determined for all the LEDs. This maximum value is defined as the maximum intrinsic source luminance.

The light-recycling envelope of this invention is a light-reflecting element that at least partially encloses the light source. The light-recycling envelope may be any three-dimensional surface that encloses an interior volume. For example, the surface of the light-recycling envelope may be in the shape of a cube, a rectangular three-dimensional surface, a sphere, a spheroid, an ellipsoid, an arbitrary three-dimensional facetted surface or an arbitrary three-dimensional curved surface. Preferably the light-recycling envelope has length, width and height dimensions such that no one dimension differs from the other two dimensions by more than a factor of five. In addition, preferably the three-dimensional shape of the light-recycling envelope is a facetted surface with flat sides in order to facilitate the attachment of the LEDs to the inside surfaces of the envelope. In general, LEDs are usually flat and the manufacture of the light-recycling envelope will be easier if the surfaces to which the LEDs are attached are also flat. Preferable three-dimensional shapes have a cross-section that is a square, a rectangle, a taper or a polygon.

The light-recycling envelope reflects and recycles a portion of the light emitted by the light source back to the light source. Preferably the reflectivity $R_E$ of the inside surfaces of the light-recycling envelope is at least 50%. More preferably, the reflectivity $R_E$ is at least 70%. Most preferably, the reflectivity $R_E$ is at least 90%. Ideally, the reflectivity $R_E$ should be as close to 100% as possible in order to maximize the efficiency and exiting luminance of the illumination system.

The light-recycling envelope may be fabricated from a bulk material that is intrinsically reflective. A bulk material that is intrinsically reflective may be a diffuse reflector or a specular reflector. Preferably a bulk material that is intrinsically reflective is a diffuse reflector. Diffuse reflectors reflect light rays in random directions and prevent reflected light from being trapped in cyclically repeating pathways. Specular reflectors reflect light rays such that the angle of reflection is equal to the angle of incidence.

Alternatively, if the light-recycling envelope is not fabricated from an intrinsically reflective material, the interior surfaces of the light-recycling envelope must be covered with a reflective coating. The reflective coating may be a specular reflector, a diffuse reflector or a diffuse reflector that is backed with a specular reflector. Diffuse reflectors typically need to be relatively thick (a few millimeters) in order to achieve high reflectivity. The thickness of a diffuse reflector needed to achieve high reflectivity can be reduced if a specular reflector is used as a backing to the diffuse reflector.

Diffuse reflectors can be made that have very high reflectivity (for example, greater than 95% or greater than 98%). However, diffuse reflectors with high reflectivity are generally quite thick. For example, diffuse reflectors with reflectivity greater than 98% are typically one or more millimeters thick. Examples of diffuse reflectors include, but are not limited to, fluoropolymer materials such as Spectralon™ from Labsphere, Inc. and polytetrafluoroethylene film from manufacturers such as Fluorglas (sold under the trade name Furon™), W. L. Gore and Associates, Inc. (sold under the trade name DRP™), or E. I. du Pont de Nemours & Company (sold under the trade name of Teflon™), layers of barium sulfate, porous polymer films containing tiny air channels such as polyethersulfone and polypropylene filter materials made by Pall Gelman Sciences, and polymer composites utilizing reflective filler materials such as, for example, titanium dioxide. An example of the latter polymer composite material is titanium dioxide filled ABS (acrylonitrile-butadiene-styrene terpolymer) produced by RTP. In the case that a polymer composite material is employed as a reflective material, such as titanium dioxide filled ABS, the light-recycling envelope can be formed from the polymer composite material and a separate light-reflecting layer is not needed on the interior surfaces of the light-recycling envelope.

Most specular reflective materials have reflectivity ranging from about 80% to about 98.5%. Examples of specular reflective materials include, but are not limited to, Silverlux™, a product of 3M Corporation, and other carrier films of plastic that have been coated with a thin metallic layer such as silver, aluminum or gold. The thickness of the metallic coating may range from about 0.05 micrometers to about 0.1 millimeter, depending on the materials used and the method of manufacturing the metal coating. Other examples of specular reflective films that have high reflectivity include photonic bandgap reflective materials and Vikuiti™ ESR (Enhanced Specular Reflector) made by 3M Corporation. The ESR film has a reflectivity of greater than 98% across much of the visible light spectrum.

The interior volume of the light-recycling envelope that is not occupied by the light source may be occupied by a vacuum, may be filled with a light transmitting gas or may be filled or partially filled with a light-transmitting solid. Any gas or solid that fills or partially fills the light-recycling envelope should transmit light emitted by the light source. Examples of light-transmitting gases are air, nitrogen and inert gases such as argon. Examples of light-transmitting solids include inorganic glasses such as silicon dioxide or sapphire and organic polymers such as polymethylmethacrylate, polystyrene, polycarbonate or silicone-containing materials.

The interior volume of the light-recycling envelope may also contain a wavelength conversion layer. Illumination systems that contain a wavelength conversion layer are described in U.S. patent application Ser. No. 10/814,044 entitled "ILLUMINATION SYSTEMS UTILIZING MULTIPLE WAVELENGTH LIGHT RECYCLING." For example, red light may be produced by an illumination system that incorporates an LED that emits red light or red light may be produced by an illumination system that incorporates an LED that emits ultraviolet light and that also incorporates a wavelength conversion layer that converts the ultraviolet light to red light. Wavelength conversion materials include powdered phosphor materials, quantum dot materials, luminescent dopant materials or a plurality of such materials.

Powdered phosphor materials are typically optical inorganic materials doped with ions of lanthanide (rare earth) elements or, alternatively, ions such as chromium, titanium, vanadium, cobalt or neodymium. The lanthanide elements are lanthanum, cerium, praseodymium, neodymium, promethium, samarium, europium, gadolinium, terbium, dysprosium, holmium, erbium, thulium, ytterbium and lutetium. Optical inorganic materials include, but are not limited to, sapphire ($Al_2O_3$), gallium arsenide (GaAs), beryllium aluminum oxide ($BeAl_2O_4$), magnesium fluoride ($MgF_2$), indium phosphide (InP), gallium phosphide (GaP), yttrium aluminum garnet (YAG or $Y_3Al_5O_{12}$), terbium-containing garnet, yttrium-aluminum-lanthanide oxide compounds, yttrium-aluminum-lanthanide-gallium oxide compounds, yttrium oxide ($Y_2O_3$), calcium or strontium or barium halophosphates $(Ca,Sr,Ba)_5(PO_4)_3(Cl,F)$, the compound $CeMgAl_{11}O_{19}$, lanthanum phosphate ($LaPO_4$), lanthanide pentaborate materials ($(lanthanide)(Mg,Zn)B_5O_{10}$), the compound $BaMgAl_{10}O_{17}$, the compound $SrGa_2S_4$, the compounds $(Sr,Mg,Ca,Ba)(Ga,Al,In)_2S_4$, the compound SrS, the compound ZnS and nitridosilicate. There are several exemplary phosphors that can be excited at 250 nm or thereabouts. An exemplary red emitting phosphor is $Y_2O_3:Eu^{3+}$.

An exemplary yellow emitting phosphor is YAG:$Ce^{3+}$. Exemplary green emitting phosphors include $CeMgAl_{11}O_{19}$:$Tb^{3+}$, ((lanthanide)$PO_4$: $Ce^{3+}$,$Tb^{3+}$) and $GdMgB_5O_{10}$:$Ce^{3+}$,$Tb^{3+}$. Exemplary blue emitting phosphors are $BaMgAl_{10}O_{17}$:$Eu^{2+}$ and $(Sr,Ba,Ca)_5(PO_4)_3Cl$: $Eu^{2+}$. For longer wavelength LED excitation in the 350–450 nm wavelength region or thereabouts, exemplary optical inorganic materials include yttrium aluminum garnet (YAG or $Y_3Al_5O_{12}$), terbium-containing garnet, yttrium oxide ($Y_2O_3$), $YVO_4$, $SrGa_2S_4$, $(Sr,Mg,Ca,Ba)(Ga,Al,In)_2S_4$, SrS, and nitridosilicate. Exemplary phosphors for LED excitation in the 350–450 nm wavelength region include YAG:$Ce^{3+}$, YAG:$Ho^{3+}$, YAG:$Pr^{3+}$, $SrGa_2S_4$:$Eu^{2+}$, $SrGa_2S_4$:$Ce^{3+}$, SrS:$Eu^{2+}$ and nitridosilicates doped with $Eu^{2+}$.

Quantum dot materials are small particles of inorganic semiconductors having particle sizes less than about 40 nanometers. Exemplary quantum dot materials include, but are not limited to, small particles of CdS, CdSe, ZnSe, InAs, GaAs and GaN. Quantum dot materials can absorb light at one wavelength and then re-emit the light at different wavelengths that depend on the particle size, the particle surface properties, and the inorganic semiconductor material. Sandia National Laboratories has demonstrated white light generation using 2-nanometer CdS quantum dots excited with near-ultraviolet LED light. Efficiencies of approximately 60% were achieved at low quantum dot concentrations dispersed in a large volume of transparent host material. Because of their small size, quantum dot materials dispersed in transparent host materials exhibit low optical backscattering.

Luminescent dopant materials include, but are not limited to, organic laser dyes such as coumarin, fluorescein, rhodamine and perylene-based dyes. Other types of luminescent dopant materials are lanthanide dopants, which can be incorporated into polymer materials. The lanthanide elements are lanthanum, cerium, praseodymium, neodymium, promethium, samarium, europium, gadolinium, terbium, dysprosium, holmium, erbium, thulium, ytterbium and lutetium. Exemplary lanthanide elements are erbium and europium.

The light-recycling envelope has a light-output aperture. The light source and the light-recycling envelope direct at least a fraction of the light emitted by the light source out of the light-recycling envelope through the light-output aperture as incoherent light having a maximum exiting luminance. The total light-output aperture area is area $A_O$. An output aperture may have any shape including, but not limited to, a square, a rectangle, a polygon, a circle, an ellipse, an arbitrary facetted shape or an arbitrary curved shape.

The embodiments of this invention also incorporated a light-collimating means, a color scrolling means and an imaging light modulator. These elements will be described in detail below. Various embodiments of this invention will now be described.

Figure 2A:
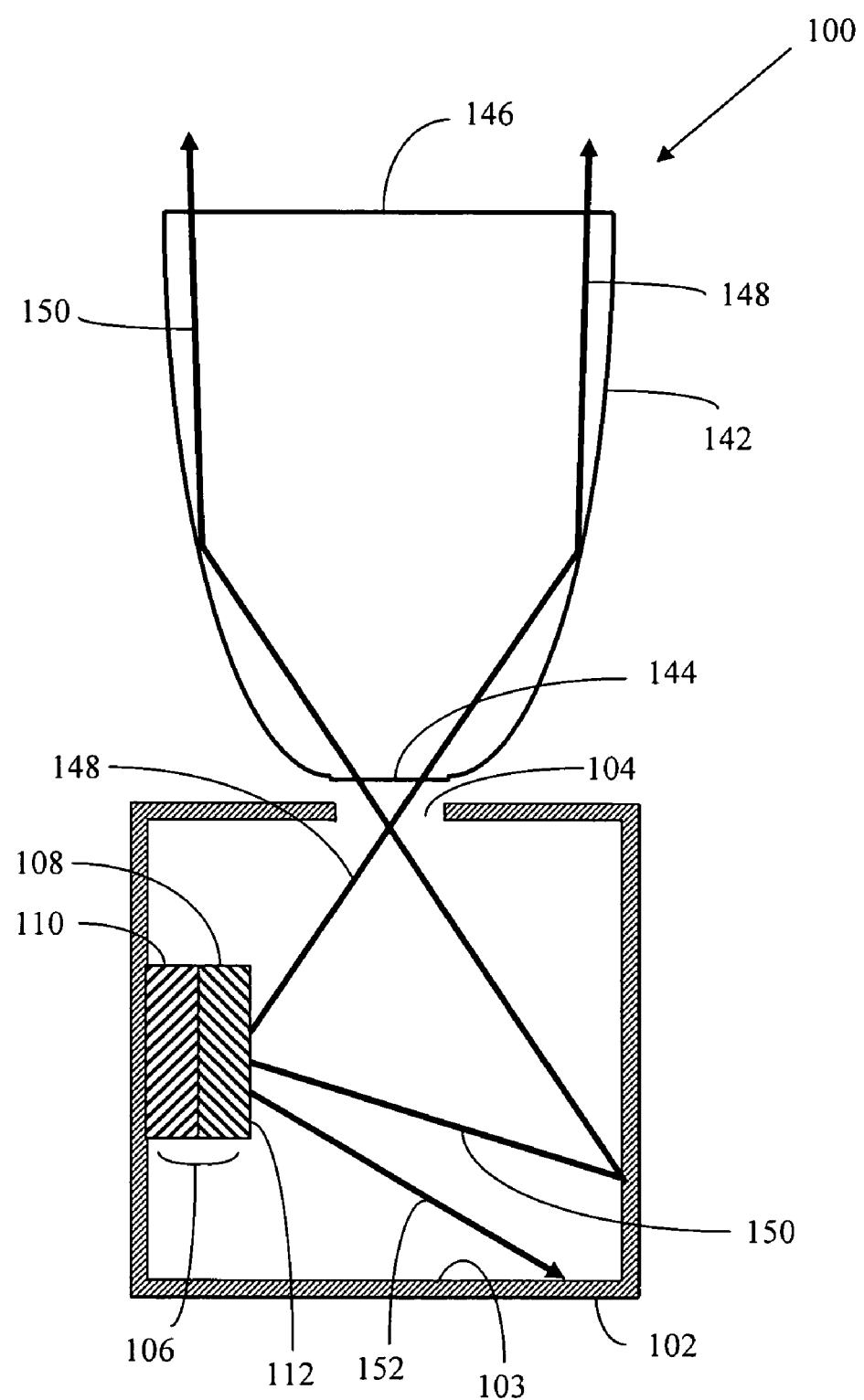
FIGS. 2A and 2B are cross-sectional views of an embodiment of this invention that has one light-emitting diode and a light-collimating means.
Figure 2B:
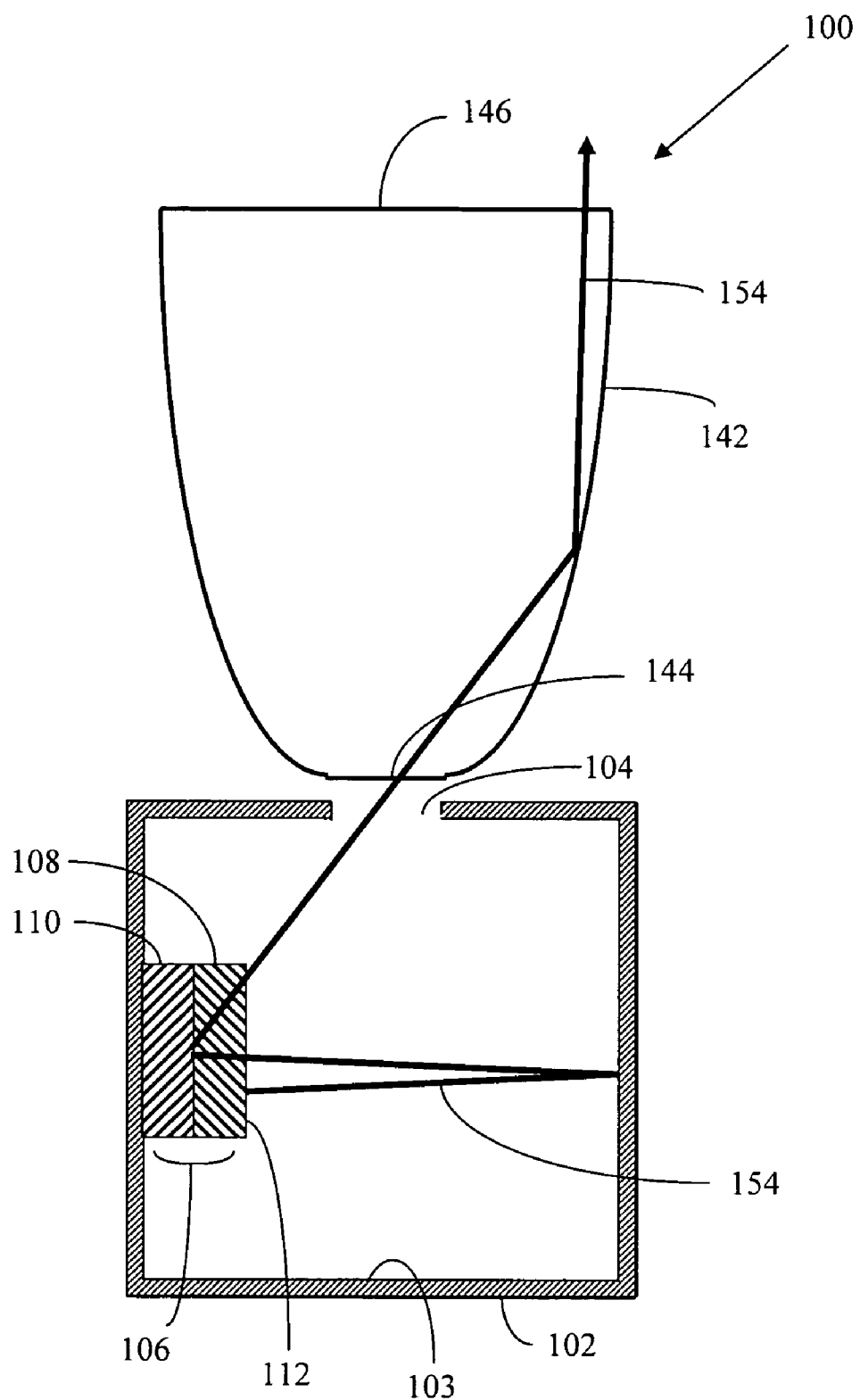

One embodiment of this invention is light-recycling illumination system 100 shown in cross-sectional side view in FIGS. 2A and 2B. For simplicity, the light-recycling envelope 102 of illumination system 100 is assumed to have a cubical three-dimensional shape and a square cross-sectional shape, the latter as shown in FIGS. 2A and 2B. The shape is chosen for illustrative purposes and for ease of understanding of the descriptions. It should also be noted that the drawing is merely a representation of the structure; the actual and relative dimensions may be different.

As noted previously, the light-recycling envelope 102 may be any three-dimensional surface that encloses an interior volume. For example, the surface of the light-recycling envelope may be in the shape of a cube, a rectangular three-dimensional surface, a sphere, a spheroid, an ellipsoid, a pyramid, an arbitrary three-dimensional facetted surface or an arbitrary three-dimensional curved surface. Preferably the three-dimensional shape of the light-recycling envelope is a facetted surface with flat sides in order to facilitate the attachment of LEDs to the inside surfaces of the envelope. The only requirement for the three-dimensional shape of the light-recycling envelope is that a fraction of any light emitted from an LED within the light-recycling envelope must also exit from the light-output aperture of the light-recycling envelope within a finite number of reflections within the light-recycling envelope, i.e. there are no reflective dead spots within the light-recycling envelope where the light emitted from the LED will endlessly reflect without exiting the light-recycling envelope through the light-output aperture.

The cross-section of the light-recycling envelope 102, such as the square cross-section shown in FIGS. 2A and 2B, may have any shape, both regular and irregular, depending on the shape of the three-dimensional surface. Other examples of possible cross-sectional shapes include a rectangle, a taper, a polygon, a circle, an ellipse, an arbitrary facetted shape or an arbitrary curved shape. Preferable cross-sectional shapes are a square, a rectangle or a polygon.

In light-recycling illumination system 100, the inside surfaces 103 of the light-recycling envelope 102, except for the area covered by the LED 106 and the area occupied by the light-output aperture 104, are light reflecting surfaces. The reflecting surfaces recycle a portion of the light emitted by the light source back to the light source. In order to achieve high light reflectivity, the light-recycling envelope 102 may be fabricated from a bulk material that is intrinsically reflective or the inside surfaces 103 of the light-recycling envelope 102 may be covered with a reflective coating. The bulk material or the reflective coating may be a specular reflector, a diffuse reflector or a diffuse reflector that is backed with a specular reflector. Examples of reflective materials were described previously. Preferably the reflectivity $R_E$ of the inside surfaces 103 of the light-recycling envelope 102 that are not occupied by the LED 106 and the light-output aperture 104 is at least 50%. More preferably, the reflectivity $R_E$ is at least 70%. Most preferably, the reflectivity $R^E$ is at least 90%. Ideally, the reflectivity $R_E$ should be as close to 100% as possible in order to maximize the efficiency and the maximum exiting luminance of the illumination system.

The square cross-sectional shape of illumination system 100 shown in FIGS. 2A and 2B has a first side containing the light-output aperture 104, a second side, a third side and a fourth side. The first side is opposite and parallel to the third side. The second side is opposite and parallel to the fourth side. The first side and third side are perpendicular to the second side and fourth side. The four sides of the illumination system shown in cross-section in FIGS. 2A and 2B plus the two remaining sides (not shown in the cross-sectional view) of the six-sided cube form the interior of the light-recycling envelope.

The light source for light-recycling illumination system 100 is LED 106, which emits light of any optical wavelength or range of wavelengths. LED 106 is positioned interior to the fourth side of the illumination system and may be any inorganic light-emitting diode or an OLED. Preferably, LED 106 is an inorganic light-emitting diode. Preferably the wavelength of the light emitted by LED 106 is greater than about 200 nanometers and less than about 700 nanometers.

If there is no wavelength conversion layer inside light-recycling envelope to convert ultraviolet light to visible light, preferably the wavelength is greater than about 400 nanometers and less than about 700 nanometers.

LED 106 has a reflecting layer 110 and an emitting layer 108. The reflecting layer is adjacent to and interior to the fourth side while the emitting layer extends into the interior of the light-recycling envelope. The reflecting layer 110 may be a specular reflector or a diffuse reflector. In a typical inorganic light-emitting diode, the reflecting layer, if present, is usually a specular reflector. The light reflectivity of reflecting layer 110 of LED 106 is $R_S$. If the reflectivity varies across the area of the reflecting layer, the reflectivity $R_S$ is defined as the average reflectivity of the reflecting layer. The reflectivity $R_S$ of reflecting layer 110 is preferably at least 50%. More preferably, the reflectivity $R_S$ of reflecting layer 110 is at least 70%. Most preferably, the reflectivity $R_S$ of reflecting layer 110 is at least 90%. Ideally, the reflectivity $R_S$ should be as close to 100% as possible in order to maximize the efficiency and the maximum exiting luminance of the illumination system.

The total light-emitting area of the light source is area $A_S$. In FIGS. 2A and 2B, the light source consists of just one LED, so the total light-emitting area $A_S$ of the light source is the light-emitting area of LED 106.

The light output from the light source, in this case LED 106, has a maximum intrinsic source luminance that depends on the light source design and the driving electrical power applied to the light source. The maximum intrinsic source luminance of the light source can be determined by measuring an identically constructed and identically powered LED that is not enclosed in a light-recycling envelope.

The light-output aperture 104 is in the first side of the illumination system. A fraction of the light emitted from the light source and reflected by the light-recycling envelope exits the light-output aperture. As noted, the aperture may have any shape including, but not limited to, a square, a rectangle, a polygon, a circle, an ellipse, an arbitrary facetted shape or an arbitrary curved shape. The total light-output aperture area is area $A_O$.

Illumination system 100 also comprises a light collimating means 142. In general, a light-collimating means can be any optical element or combination of elements that at least partially collimates the light exiting from the light-output aperture 104. For example, the light-collimating means can be a compound parabolic reflector, a convex lens, a tapered light guide, or a combination of two or more such elements. In FIGS. 2A and 2B, light-collimating means 142 is a compound parabolic reflector for illustrative purposes. A compound parabolic reflector is a tapered light guide that transports light by reflecting light from the inside surfaces of the tapered light guide. The compound parabolic reflector may be constructed from a solid transparent material. If the compound parabolic reflector is constructed from such a solid transparent material, light can pass through the material and reflect from the inside surfaces of the compound parabolic reflector by total internal reflection. Alternatively, the compound parabolic reflector may be a hollow structure and the sides of the compound parabolic reflector must then be covered with a reflective coating in order to reflect light. Light-collimating means 142 has an input surface 144, which is adjacent to the light-output aperture 104 and which accepts uncollimated light, and an output surface 146. The input surface 144 accepts uncollimated light from the light-output aperture 104. The light-collimating means 142 partially collimates the previously uncollimated light and transmits the partially collimated light through the output surface 146. In order for the light-collimating means to partially collimate the light exiting the light-output aperture 104, the area of input surface 144 must be less than the area of the output surface 146.

The degree of light collimation required from the light-collimating means depends on the application. The light that exits through the light-output aperture 104 typically has a Lambertian (output angles of −90 degrees to +90 degrees or a solid angle of $2\pi$) or near Lambertian angular distribution. The degree of collimation exiting the light-collimating means 142 can be adjusted as needed by changing the area of the output surface 146 relative to the area of the input surface 144. If the input refractive index $n_{in}$ of the light-collimating means is equal to the output refractive index $n_{out}$ of the light-collimating means, then the light output projected solid angle distribution $\Omega_{out}$ from the light-collimating means is given by $$\Omega_{out} = \Omega_{in}(Area_{in})/(Area_{out}),$$ [Equation 1]

where $\Omega_{in}$ is the light input projected solid angle distribution into the light-collimating means, $Area_{in}$ is the area of the input surface 144 and $Area_{out}$ is the area of the output surface 146.

For applications requiring a high degree of light collimation, the light-collimating means 142 partially collimates the light so that the light output distribution is preferably within the angular range of −35 degrees to +35 degrees. More preferably, light-collimating means 142 partially collimates the light so that the light output distribution is within the angular range of −25 degrees to +25 degrees. Most preferably, light-collimating means 142 partially collimates the light so that the light output distribution is within the angular range of −15 degrees to +15 degrees.

Light may be emitted from emitting layer 108 of LED 106 through one or more of the surfaces of emitting layer 108 that do not contact reflecting layer 110. For example, light may be emitted through surface 112. The paths of four representative light rays emitted from LED 106 are shown in FIGS. 2A and 2B.

In FIG. 2A, a first light ray 148 emitted from the surface 112 of emitting layer 108 of the LED 106 on the fourth side passes through the interior of the light-recycling envelope 102 to exit through the light-output aperture 104 on the first side without reflecting off the reflecting sides of the light-recycling envelope. The first light ray 148 passes through the input surface 144 of light-collimating means 142, reflects off the sides of light-collimating means 142 and exits light-collimating means 142 through output surface 146 as partially collimated light.

A second light ray 150 emitted from the surface 112 of the emitting layer 108 of the LED 106 passes through the interior of the light-recycling envelope and is reflected by the light-recycling envelope 102 on the second side. The reflected ray 150 then passes through the interior of the light-recycling envelope to exit through the light-output aperture 104 on the first side. This is merely an illustrative example since the second ray 150 can reflect a finite number of times from the reflective surfaces of any and all of the sides before exiting the light-recycling envelope through the light-output aperture. The second light ray 150 passes through the input surface 144 of light-collimating means 142, reflects off the sides of light-collimating means 142 and exits light-collimating means 142 through output surface 146 as partially collimated light.

A third light ray 152 emitted from the surface 112 of the emitting layer 108 of LED 106 passes through the interior of the light-recycling envelope 102 and is absorbed by the light-recycling envelope 102 on the third side. In general, the light-recycling envelope is not a perfect reflector and has a reflectivity less than 100%. Some of the light, such as light ray 152, will be absorbed. Due to the absorption losses, only a fraction of the light that is inside the light-recycling envelope will exit the light-recycling envelope through the light-output aperture 104.

In FIG. 2B, a fourth light ray 154 emitted from the surface 112 of the emitting layer 108 of the LED 106 during a first time period passes through the interior of the light-recycling envelope 102 and is reflected by the light-recycling envelope on the second side. The reflected fourth light ray 154 passes through the interior of the light-recycling envelope and is recycled back to the light source. The fourth light ray 154 is transmitted through surface 112 and the emitting layer 108 of the LED 106 to reflect off the reflecting layer 110 of the LED 106. The fourth light ray 154 then is transmitted through the emitting layer 108 of LED 106 and through the surface 112 during a second time period, passes through the interior of the light-recycling envelope and exits the light-output aperture 104. The fourth light ray 154 passes through the input surface 144 of light-collimating means 142, reflects off the sides of light-collimating means 142 and exits light-collimating means 142 through output surface 146 as partially collimated light.

Light rays 148, 150 and 152 are not recycled back to the light source. Light ray 154 is recycled back to the light source. Only a portion of the light emitted by the light source is recycled back to the light source.

When the fourth light ray 154 reflects off reflecting layer 110 of LED 106 and is transmitted through emitting layer 108 and surface 112 to enter the light-recycling envelope during the second time period, the reflected light ray 154 adds to the light rays concurrently being emitted by emitting layer 108 of LED 106 during the second time period. The reflected light ray increases the effective source luminance of LED 106 so that the effective source luminance is then higher than the maximum intrinsic source luminance of LED 106 measured in the absence of light recycling.

The maximum exiting luminance of the light exiting the light-output aperture 104 cannot be greater than the effective luminance of the light source. However, by utilizing a light-recycling envelope to recycle a portion of the light emitted by the light source back to the reflecting layer of the light source, the effective luminance of the light source can be increased so that the maximum exiting luminance of the light exiting the light-output aperture 104 can then be greater than the maximum intrinsic source luminance of an identical LED measured in the absence of light recycling. Note that when the maximum exiting luminance of the light exiting the light-output aperture 104 of illumination system 100 is compared to the maximum intrinsic source luminance of an identical LED in the absence of light recycling, the LED 106 of the illumination system 100 and the identical LED used in the reference measurement are of the same design and are operated at the same electrical power. Also note that measuring the exiting luminance over the full range of exiting angles and selecting the maximum luminance value determines the maximum exiting luminance.

The fourth light ray 154 will usually be unaffected transmitting through the emitting layer 108 of LED 106 whether the emitting layer 108 is emitting light or not. The fourth light ray 154 could, alternatively, reflect off the light-recycling envelope on the first or third side before reflecting off the reflecting layer 110 of the LED on the fourth side. This is merely an illustrative example since the fourth light ray 154 can reflect a finite number of times from the reflective surfaces of any and all the sides before or after reflecting off the reflecting layer 110 of the LED, once or any finite number of times, before the fourth light ray exits the light-recycling envelope through the light-output aperture 104.

The maximum reflectivity of the inside surfaces 103 of light-recycling illumination system 100 and the resulting maximum exiting luminance exiting from the light-output aperture 104 is achieved by preferably having the entire interior surfaces of illumination system 100 be reflective except for the total area $A_O$ of the output aperture 104. The total inside area of the light-recycling envelope is $A_T$, which includes area $A_O$ and the total light-emitting area $A_S$ of the light source. The LED light source has a reflecting layer 110 having reflectivity $R_S$. In the example of FIGS. 2A and 2B, area $A_S$ is the light-emitting area of LED 106, but for other examples having more than one LED, $A_S$ is the total light-emitting area of all the LEDs within the light-recycling envelope. The remaining inside area of the light-recycling envelope that is not covered by the total light-emitting area $A_S$ of the LED and the area $A_O$ of the output aperture is denoted as remaining area $A_R$. Preferably the entire remaining area $A_R$ of the light-recycling envelope should have a reflective surface of reflectivity $R_E$ to maximize the luminance exiting from the light-output aperture or apertures. As noted previously, the reflectivity $R_E$ is preferably at least 50%. More preferably, the reflectivity $R_E$ is at least 70%. Most preferably, the reflectivity $R_E$ is at least 90%. Ideally the reflectivity $R_E$ should be as close to 100% as possible in order to maximize the efficiency and the maximum exiting luminance of the illumination system.

Since the area $A_S$ and the area $A_R$ are not perfect reflectors and do absorb some of the light during each reflection, the maximum illumination system efficiency and the maximum exiting luminance are achieved by minimizing the number of light reflections. For a given fixed total light-emitting area $A_S$ and a given fixed total area $A_O$ of the light-output aperture, the maximum exiting luminance directed from the light-output aperture is achieved by minimizing the remaining area $A_R$ in order to minimize the number of reflections. Usually it is not possible for the remaining area $A_R$ to be zero, however, since it is usually not possible to arrange the one or more LEDs in the illumination system to cover the entire area of the light-recycling envelope that is not occupied by the light-output aperture.

The light-recycling illumination system 100 can achieve an enhanced maximum exiting luminance that is greater than the maximum intrinsic source luminance of the light source only if the total light-output aperture area $A_O$ of the light-output aperture 104 is less than the total light-emitting area $A_S$ of the light source. This area requirement for exiting luminance enhancement can be understood from the following theoretical examples. First assume that the inside surfaces of a theoretical illumination system have no absorption losses, i.e. areas $A_S$ and $A_R$ all have 100% reflectivity. Also assume that the light source emits light in a Lambertian distribution. Note that a Lambertian emitter is an emitter that has a constant luminance for all emitting angles from –90 degrees to +90 degrees.

If the light output area $A_O$ is equal to the total light-emitting area $A_S$, then all the light flux emitted by the source will exit the theoretical illumination system in the same area and will, in most cases, will have the same Lambertian distribution. If the output distribution of the light exiting the light-output aperture is Lambertian, then the exiting luminance will be equal to the maximum intrinsic source luminance.

If the light output area $A_O$ of the theoretical illumination system is larger than the total light-emitting area $A_S$, the light exiting the light-output aperture can have the same Lambertian distribution but will have a maximum exiting luminance that is less than the maximum intrinsic source luminance due to the output light flux being spread over a larger area. The exiting luminance directed from the light-output aperture will be lower by a factor of $A_S/A_O$.

If the light output area $A_O$ of the theoretical illumination system is smaller than the total light-emitting area $A_S$ and no light is lost or absorbed inside the illumination system, the light exiting the light output area can have the same Lambertian distribution but will have a maximum exiting luminance that is greater than the maximum intrinsic source luminance due to the reduced area of the light-output aperture. The maximum exiting luminance directed from the light-output aperture will be greater by a factor of $A_S/A_O$. To achieve a maximum exiting luminance that is greater than the maximum intrinsic source luminance, it is therefore a requirement that the output area $A_O$ be less than the total light-emitting area $A_S$.

However, the area requirement that $A_O$ must be less than $A_S$ is not the only requirement needed in order to achieve an enhancement of the maximum exiting luminance in an illumination system. In a typical illumination system, the reflectivity $R_S$ and the reflectivity $R_E$ will be less than 100%, which will lower the maximum exiting luminance enhancement: Light that does not exit the light-output aperture 104 on the first attempt may be absorbed by the light source or the light-recycling envelope as it is reflected one or more times inside the light-recycling envelope. These losses will reduce the exiting luminance. Therefore, in order to achieve an enhancement of the maximum exiting luminance in a typical illumination system, $R_S$ and $R_E$ must be relatively high even if they are not 100%. The preferred values for $R_S$ and $R_E$ were listed previously.

Furthermore, in a typical illumination system, the light source may not emit light in a wide Lambertian (−90 degrees to +90 degrees) angular distribution but in a narrower angular distribution. When a light source initially emits light in a narrow angular distribution and when the emitted light then undergoes multiple reflections inside the illumination system, the light exiting the light-output aperture will have a wider angular distribution than the initial angular distribution. The output distribution can approximate a Lambertian distribution. Expanding the original narrow angular distribution to a wider output distribution inside the illumination system also reduces the maximum exiting luminance of the light exiting the light-output aperture. Therefore, in order to achieve an enhancement of the maximum exiting luminance in a typical illumination system, the angular distribution of the light emitted by the light source should be as close to a Lambertian distribution as possible.

The maximum theoretical luminance enhancement is given by the ratio of the areas $A_S/A_O$ as shown above. For example, if $A_S$ equals 20 mm² and $A_O$ equals 1 mm², then the maximum theoretical exiting luminance enhancement is $A_S/A_O$ or 20. The maximum value is achieved only if the LED is a Lambertian emitter and only if $R_S$ and $R_E$ each equal 100%. If the LED is not a perfect Lambertian emitter or if $R_S$ and $R_E$ are each less than 100%, as is normally the case, enhancement of the maximum exiting luminance can still be achieved but the enhancement will be less than the maximum theoretical value. In such cases, the area $A_O$ may need to be significantly less than $A_S$ in order to achieve a maximum exiting luminance that is greater than the maximum intrinsic source luminance. Preferably, the area $A_O$ of the light-output aperture 104 is less than or equal to 50% of the total light-emitting area $A_S$ of the light source. More preferably, the area $A_O$ of the light-output aperture 104 is less than or equal to 30% of the total light-emitting area $A_S$ of the light source. Most preferably, the area $A_O$ of the light-output aperture 104 is less than or equal to 10% of the total light-emitting area $A_S$ of the light source. In addition, for some applications it is desirable that the area $A_O$ of the light-output aperture 104 be small and comparable in size to the area of an arc lamp source. For those applications, preferably the area $A_O$ of the light-output aperture 104 is less than 25 mm² in area. More preferably, the area $A_O$ of the light-output aperture 104 is less than 10 mm².

As noted previously, illumination system 100 incorporates a light-collimating means 142. The maximum exiting luminance of the light exiting the output surface 146 of light-collimating means 142 can be equal to, but not greater than, the maximum exiting luminance of the light exiting the light-output aperture 104. If some light is lost or absorbed inside light-collimating means 142, then the maximum exiting luminance of the light exiting the output surface 146 of light-collimating means 142 will be less than the maximum exiting luminance of the light exiting the light-output aperture 104.

The embodiments of this invention illustrated in FIGS. 2A and 2B are illustrated with one LED as the light source. However, embodiments of this invention may incorporate more than one LED. The number of LEDs placed inside a light-recycling envelope can vary widely depending, for example, on the available inside area of the light-recycling envelope and the desired number of emitted colors that one would like to produce inside the light-recycling envelope. In general, a light-recycling illumination system may contain any number of LEDs on the inside surface of the light-recycling envelope as long as the LEDs do not overlap each other and do not overlap the light-output aperture. The LEDs may cover the entire inside surface of the light-recycling envelope with the exception of the area of the light-output aperture. One or more of the LEDs may emit light of a first color, one or more of the LEDs may emit light of a second color, one or more of the LEDs may emit light of a third color and so forth. In some cases, it may be advantageous to have four or more types of LEDs that emit four or more different colors.

FIGS. 3A–3D illustrate cross-sectional views of a light-recycling illumination system 200, an embodiment of this invention that has a light source consisting of three LEDs. The LEDs are denoted as LED 206a, LED 206b and LED 206b. Each of the three LEDs emits and reflects light.

The characteristics and properties of LEDs 206a, 206b and 206c, emitting layers 208a, 208b and 208c, reflecting layers 210a, 210b and 210c, the light-recycling envelope 202, the inside surfaces 203 and the light-output aperture 204 are identical to the characteristics and properties of the respective elements in illumination system 100.

The light-collimating means 242 for illumination system 200 can be any optical element or combination of elements that at least partially collimates the light exiting from the light-output aperture 204. For example, the light-collimating means can be a compound parabolic reflector, a convex lens, a tapered light guide, or a combination of two or more such elements. In FIGS. 3A–3D, the light-collimating means is shown, for illustrative purposes, to be a compound parabolic reflector. The characteristics and properties of the light-collimating means and a compound parabolic reflector were described previously for illumination system 100.

For applications requiring a high degree of light collimation, the light-collimating means 242 partially collimates the light so that the light output distribution is preferably within the angular range of −35 degrees to +35 degrees. More preferably, light-collimating means 242 partially collimates the light so that the light output distribution is within the angular range of −25 degrees to +25 degrees. Most preferably, light-collimating means 242 partially collimates the light so that the light output distribution is within the angular range of −15 degrees to +15 degrees.

$A_S$ stated previously, the light-recycling envelope may have any three-dimensional shape that encloses an interior volume. Preferably the three-dimensional shape of the light-recycling envelope is a facetted surface with flat sides in order to facilitate the attachment of LEDs to the inside surfaces of the envelope. The square cross-sectional shape of light-recycling illumination system 200 shown in FIGS. 3A–3D has a first side containing the light-output aperture 204, a second side, a third side and a fourth side. The first side is opposite and parallel to the third side. The second side is opposite and parallel to the fourth side. The first side and third side are perpendicular to the second side and fourth side. The four sides of the illumination system shown in cross-section in FIGS. 3A–3D plus the two remaining sides (not shown in the figures) of the six-sided cube form the interior of the light-recycling envelope.

In light-recycling illumination system 200, LED 206a is on the fourth side, LED 206b is on the third side and LED 206c is on the second side. In general, the three LEDs may emit light of the same color or the three LEDs may emit light of different colors. In FIGS. 3A–3D, the particular example is chosen where each LED emits a different color. For illustrative purposes, the three colors are chosen to be red, green and blue. It is also within the scope of this invention that colors other than red, green and blue may be utilized. Furthermore, colors in addition to red, green and blue may be utilized for illumination systems that have more than three LEDs. The additional colors may include, for example, yellow, cyan and magenta.

In FIGS. 3A–3D, LED 206a is assumed to emit red light. Red light rays are illustrated throughout the remainder of this application using solid lines as in FIG. 3A. LED 206b is assumed to emit green light. Green light rays are illustrated throughout the remainder of this application using dashed lines as in FIG. 3B. LED 206c is assumed to emit blue light. Blue light rays are illustrated throughout the remainder of this application using dotted lines as in FIG. 3C. The red and green colors, the red and blue colors, the green and blue colors or all three colors may be emitted concurrently to produce additional colors. If red, green and blue are emitted concurrently in the proper proportions, the output of illumination system 200 is white light.

As in light-recycling illumination system 100, a portion of the light emitted by the light source in light-recycling illuminations system 200, in this case the three LEDs, is reflected and recycled back to the reflecting layers of the three LEDs by the light-recycling envelope. It is also possible for light emitted by one LED to reflect off the reflecting layer of the second LED or the third LED. The latter type of reflected light is another form of recycled light since it is light emitted by one element of the light source (one of the LEDs) that is recycled back to another element of the light source (the second or third LED) where it is reflected by the reflecting layer of the second or third LED. Both forms of recycled light increase the effective brightness of the light source. The reflectivity of the inside surfaces 203 of the light-recycling envelope is $R_E$. The reflectivity of reflecting layer 210a of LED 206a, reflecting layer 210b of LED 206b and reflecting layer 210c of LED 206c is $R_S$. The preferred values for $R_E$ and $R_S$ for illumination system 200 are identical to the preferred values listed previously for light-recycling illumination system 100. Ideally, $R_E$ and $R_S$ should be as close to 100% as possible in order to maximize the efficiency and the maximum exiting luminance of the illumination system.

Example light rays in FIGS. 3A–3D illustrate some aspects of the operation of illumination system 200.

Figure 3A:
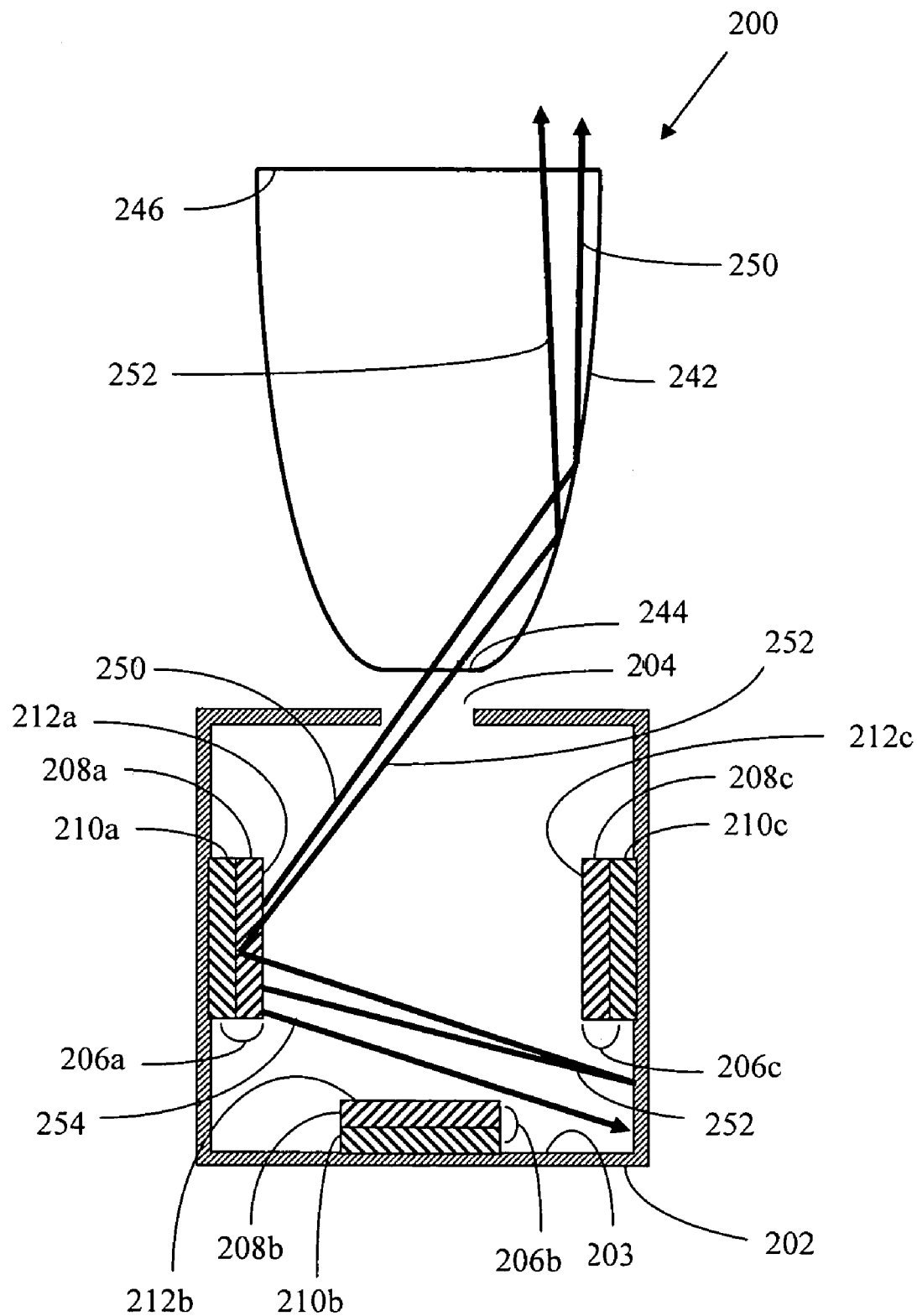
FIGS. 3A–3D are cross-sectional views of an embodiment of this invention that has three light-emitting diodes and a light-collimating means.

In FIG. 3A, a first red (solid line) light ray 250 emitted from the surface 212a of emitting layer 208a of the LED 206a on the fourth side passes through the interior of the light-recycling envelope 202 and exits through the light-output aperture 204 on the first side without reflecting off the reflecting sides of the light-recycling envelope. The first red light ray 250 enters the light-collimating means 242 through input surface 244, is reflected by the side surfaces of the light-collimating means and exits the light-collimating means 242 through output surface 246 as partially collimated light.

A second red light ray 252 is emitted from the surface 212a of the emitting layer 208a of the LED 206a in a first time period, passes through the interior of the light-recycling envelope 202 and is reflected by the light-recycling envelope on the second side. The second red light ray 252 then passes through the interior of the light-recycling envelope back to the surface 212a of LED 206a. The second red light ray 252 passes through surface 212a and emitting layer 208a, is reflected by reflecting layer 210a and passes through emitting layer 208a and surface 212a a final time and in a second time period. The second red light ray 252 passes through the interior of the light recycling envelope and exits through the light-output aperture 204 on the first side. This is merely an illustrative example since the second red light ray 252 can reflect a finite number of times from the reflective surfaces of any and all of the sides before exiting the light-recycling envelope through the light-output aperture. When the second red light ray 252 passes through the surface 212a a final time and in a second time period, it adds to light concurrently being emitted by emitting layer 208a in the second time period and increases the effective luminance of LED 206a. Only a portion of the light of a first color, red light ray 252 in this example, is recycled back to the reflecting layer 210a. After exiting the light-output aperture 204, the second red light ray 252 enters the light-collimating means 242 through input surface 244, is reflected by the side surfaces of the light-collimating means and exits the light-collimating means 242 through output surface 246 as partially collimated light.

A third red light ray 254 emitted from the surface 212a of the emitting layer 208a of LED 206a passes through the interior of the light-recycling envelope 202 and is absorbed by the light-recycling envelope 202 on the second side. In general, the light-recycling envelope is not a perfect reflector and has a reflectivity less than 100%. Some of the light, such as red light ray 254, will be absorbed. Due to the absorption losses, only a fraction of the red light that is inside the light-recycling envelope will exit the light-recycling envelope through the light-output aperture 204.

Figure 3B:
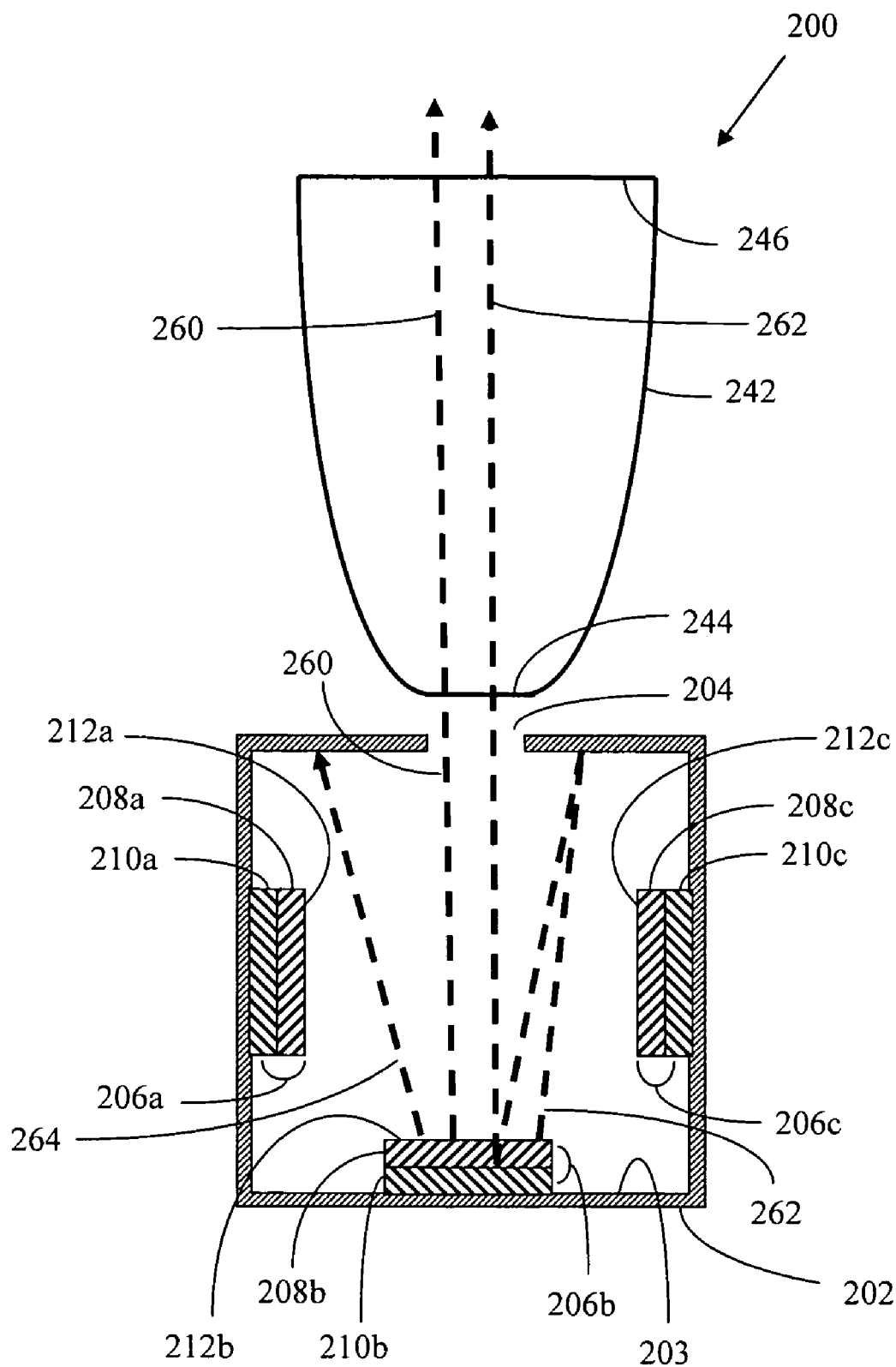

In FIG. 3B, a first green (dashed line) light ray 260 emitted from the surface 212b of emitting layer 208b of the LED 206b on the third side passes through the interior of the light-recycling envelope 202 and exits through the light-output aperture 204 on the first side without reflecting off the reflecting sides of the light-recycling envelope. The first green light ray 260 enters the light-collimating means 242 through input surface 244, is partially collimated by the side surfaces of the light-collimating means and exits the light-collimating means 242 through output surface 246 as partially collimated light.

A second green light ray 262 emitted from the surface 212b of the emitting layer 208b of the LED 206b in a first time period passes through the interior of the light-recycling envelope, is reflected by the light-recycling envelope 202 on the first side and then passes through the interior of the light-recycling envelope to the surface 212b of LED 206b. The second green light ray 262 passes through surface 212b and emitting layer 208b, is reflected by reflecting layer 210b and passes through emitting layer 208b and surface 212b a final time and in a second time period. The second green light ray 262 passes through the interior of the light recycling envelope and exits through the light-output aperture 204 on the first side. When the second green light ray 262 passes through the surface 212b a final time and in a second time period, it adds to light concurrently being emitted by emitting layer 208b in the second time period and increases the effective luminance of LED 206b. Only a portion of the green light, green light ray 262 in this example, is recycled back to the reflecting layer 210b. After exiting light-output aperture 204, the second green light ray 262 enters the light-collimating means 242 through input surface 244, is partially collimated by the side surfaces of the light-collimating means and exits the light-collimating means 242 through output surface 246 as partially collimated light.

A third green light ray 264 emitted from the surface 212b of the emitting layer 208b of LED 206b passes through the interior of the light-recycling envelope 202 and is absorbed by the light-recycling envelope 202 on the first side. Due to the absorption losses, only a fraction of the green light that is inside the light-recycling envelope will exit the light-recycling envelope through the light-output aperture 204.

Figure 3C:
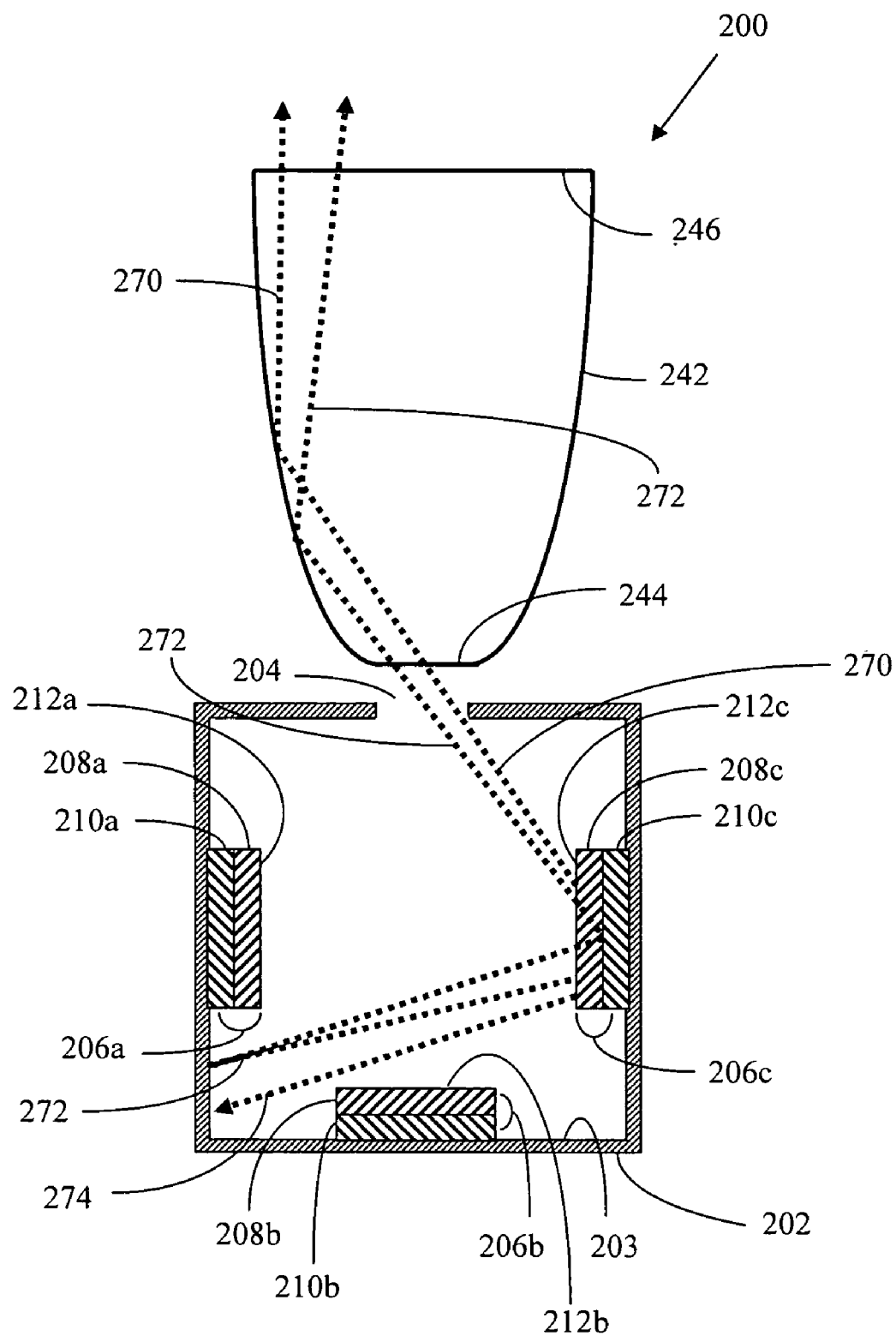

In FIG. 3C, a first blue (dotted line) light ray 270 emitted from the surface 212c of emitting layer 208c of the LED 206c on the second side passes through the interior of the light-recycling envelope 202 to exit through the light-output aperture 204 on the first side without reflecting off the reflecting sides of the light-recycling envelope. The first blue light ray 270 enters the light-collimating means 242 through input surface 244, is reflected by the side surfaces of the light-collimating means and exits the light-collimating means 242 through output surface 246 as partially collimated light.

A second blue light ray 272 emitted from the surface 212c of the emitting layer 208c of the LED 206c in a first time period passes through the interior of the light-recycling envelope and is reflected by the light-recycling envelope 202 on the fourth side. The second blue light ray 272 then passes through the interior of the light-recycling envelope to the surface 212c of LED 206c. The second blue light ray 272 passes through surface 212c and emitting layer 208c, is reflected by reflecting layer 210c and passes through emitting layer 208c and surface 212c a final time and in a second time period. The second blue light ray 272 passes through the interior of the light recycling envelope and exits through the light-output aperture 204 on the first side. When the second blue light ray 272 passes through the surface 212c a final time and in a second time period, it adds to light concurrently being emitted by emitting layer 208c in the second time period and increases the effective luminance of LED 206c. Only a portion of the blue light, blue light ray 272 in this example, is recycled back to the reflecting layer 210c. After exiting the light-output aperture 204, the second blue light ray 272 enters the light-collimating means 242 through input surface 244, is reflected by the side surfaces of the light-collimating means and exits the light-collimating means 242 through output surface 246 as partially collimated light.

A third blue light ray 274 emitted from the surface 212c of the emitting layer 208c of LED 206c passes through the interior of the light-recycling envelope 202 and is absorbed by the light-recycling envelope 202 on the fourth side. Due to the absorption losses, only a fraction of the blue light that is inside the light-recycling envelope will exit the light-recycling envelope through the light-output aperture 204.

Figure 3D:
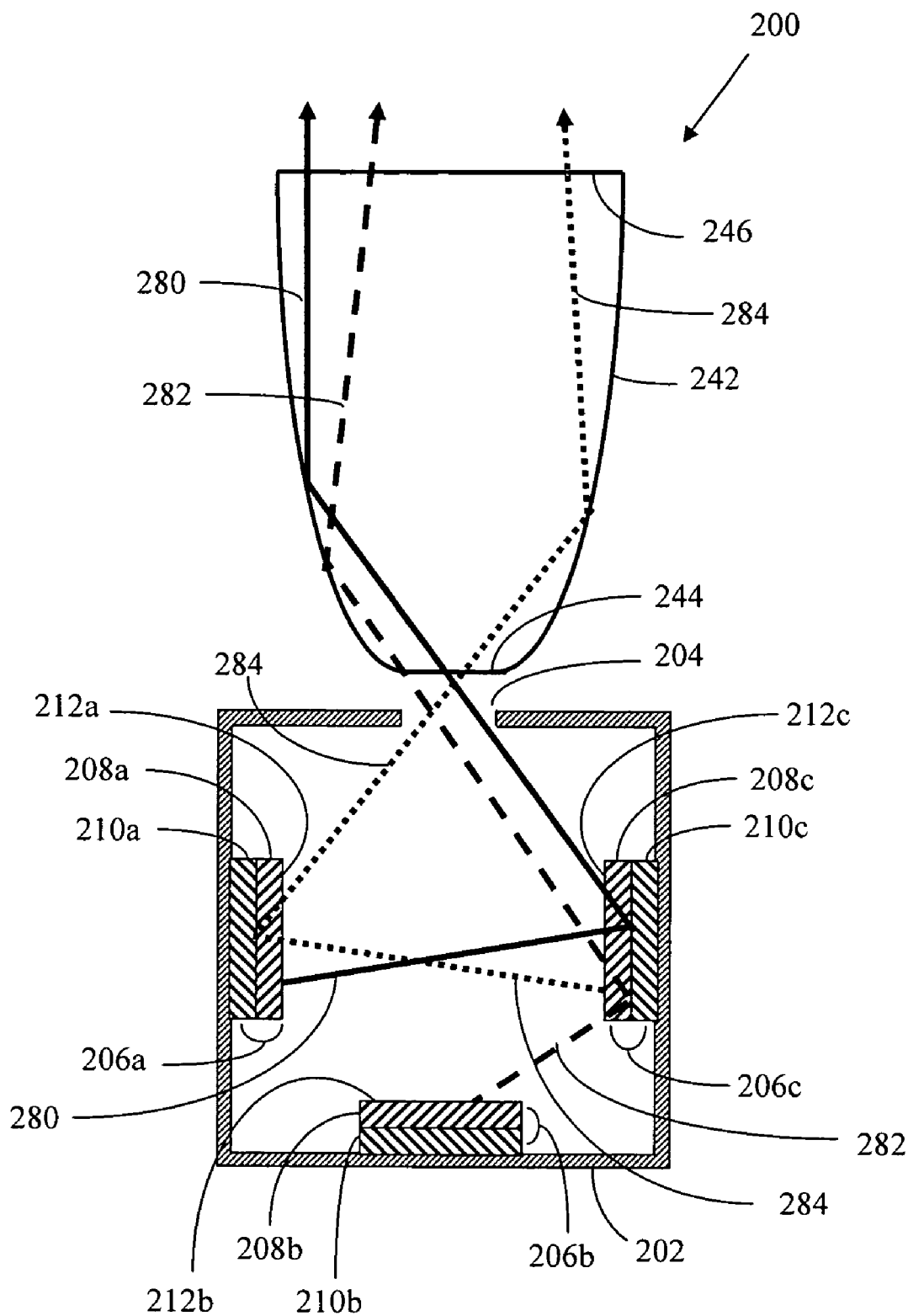

When the light source is comprised of two or more LEDs inside the light-recycling envelope, the effective brightness of the light source may also be increased when light of one LED is directed to and reflected by another LED, i.e. when light emitted by one part of the light source is recycled back to another part of the light source. FIG. 3D illustrates examples of rays emitted by one LED of the light source that reflect off the second or third LED of the light source.

In FIG. 3D, red (solid line) light ray 280 is emitted from surface 212a of emitting layer 208a of LED 206a in a first time period. Red light ray 280 passes through the interior of the light-recycling envelope to surface 212c of LED 206c. Red light ray 280 passes through surface 212c and emitting layer 208c, is reflected by reflecting layer 210c and passes through emitting layer 208c and surface 212c a final time and in a second time period. Red light ray 280 then passes through the interior of the light-recycling envelope 202 and exits the light-recycling envelope through the light-output aperture 204. When red light ray 280 passes through surface 212c a final time and in a second time period, it adds to the blue light concurrently being emitted by LED 206c in the second time period and increases the effective luminance of LED 206c. After exiting light-output aperture 204, red light ray 280 enters the light-collimating means 242 through input surface 244, is reflected by the side surfaces of the light-collimating means and exits the light-collimating means 242 through output surface 246 as partially collimated light.

Green (dashed line) light ray 282 is emitted from surface 212b of emitting layer 208b of LED 206b in a first time period. Green light ray 282 passes through the interior of the light-recycling envelope to surface 212c of LED 206c. Green light ray 282 passes through surface 212c and emitting layer 208c, is reflected by reflecting layer 210c and passes through emitting layer 208c and surface 212c a final time and in a second time period. Green light ray 282 then passes through the interior of the light-recycling envelope 202 and exits the light-recycling envelope through the light-output aperture 204. When green light ray 282 passes through surface 212c a final time and in a second time period, it adds to the blue light concurrently being emitted by LED 206c in the second time period and increases the effective luminance of LED 206c. After exiting light-output aperture 204, green light ray 282 enters the light-collimating means 242 through input surface 244, is reflected by the side surfaces of the light-collimating means and exits the light-collimating means 242 through output surface 246 as partially collimated light.

Blue (dotted line) light ray 284 is emitted from surface 212c of emitting layer 208c of LED 206c in a first time period. Blue light ray 284 passes through the interior of the light-recycling envelope to surface 212a of LED 206a. Blue light ray 284 passes through surface 212a and emitting layer 208a, is reflected by reflecting layer 210a and passes through emitting layer 208a and surface 212a a final time and in a second time period. Blue light ray 284 then passes through the interior of the light-recycling envelope 202 and exits the light-recycling envelope through the light-output aperture 204. When blue light ray 284 passes through surface 212a a final time and in a second time period, it adds to the red light concurrently being emitted by LED 206a in the second time period and increases the effective luminance of LED 206a. After exiting light-output aperture 204, blue light ray 284 enters the light-collimating means 242 through input surface 244, is reflected by the side surfaces of the light-collimating means and exits the light-collimating means 242 through output surface 246 as partially collimated light.

The total light-emitting area of the light source in light-recycling illumination system 200 is area $A_S$. In this embodiment, the light source consists of three LEDs, so the total light-emitting area $A_S$ of the light source is the combined light-emitting area of the three LEDs. The light source emits light with a maximum intrinsic source luminance. As stated previously, the maximum intrinsic source luminance is determined by measuring the luminance for each LED in the light source when the light-recycling envelope is not present and when no other LED is directing light to the LED under measurement. The measurements are done with each LED powered at the same level as in illumination system 200 and are done as a function of emitting angle. Then from these luminance measurements, a maximum luminance value can be determined. This maximum value is defined as the maximum intrinsic source luminance.

The total light-output aperture area is area $A_O$. Light-recycling illumination system 200 has only one light-output aperture 204, which therefore has area $A_O$. If $A_O$ is less than $A_S$ and $R_E$ and $R_S$ are each greater than 50% in light-recycling illumination system 200, then it is possible for the maximum exiting luminance of light-recycling illumination system 200 to be greater than the maximum intrinsic source luminance of the light source.

The examples of light-recycling illumination systems described above can be used as sub-systems in projection displays that incorporate color scrolling. Preferred embodiments of this invention are projection display systems that comprise at least one light-recycling illumination system, a color scrolling means and an imaging light modulator to form spatially varying and time varying images.

The color scrolling means sequentially scans colored bands of light across the face of the imaging light modulator. The color scrolling means is located in the light optical path of the partially collimated light exiting the light collimating means. Color scrolling means include, but are not limited to, a color filter wheel and a set of rotating prisms.

A color filter wheel is a rotating wheel that consists of repeating sets of color filters positioned around the periphery of the wheel. Each set of color filters has one filter for each color used in the projection display system. For example, if the projection display system utilizes the three colors red, green and blue, the set of color filters consists of a red-transmitting filter that transmits red light and reflects green and blue light, a green-transmitting filter that transmits green light and reflects red and blue light and a blue-transmitting filter that transmits blue light and reflects red and green light. The rotation of the color filter wheel causes bands of red, green and blue light to scroll sequentially across the face of the imaging light modulator. Each band of color usually covers less than approximately one-third of the imaging light modulator area. All three bands of light are directed to the imaging light modulator at the same time to simultaneously cover a large portion of the imaging light modulator area. After a band of one color completes a scan across the face of the imaging light modulator, a new band of the same color begins a new scan across the imaging light modulator starting from the opposite side and the sequence of events is repeated. Narrow dark regions between the wider colored bands allow for the imaging light modulator to be readdressed with the correct image information for the subsequently scrolled color.

Another example of a color scrolling means is a set of rotating prisms. There is normally one rotating prism for each color that is used in the projection display system and a single color is transmitted through each prism. For example, if the projection display system utilizes the three colors red, green and blue, there is first rotating prism for scrolling red light emitted from a red light source, a second rotating prism for scrolling green light emitted from a green light source and a third rotating prism for scrolling blue light emitted from a blue light source. The rotation of a prism causes the band of colored light that is transmitted through the prism to be scrolled across the face of the imaging light modulator. The rotation motions of the three prisms are adjusted so that, for example, a band of red light is first scrolled across the face of the imaging light modulator. Immediately following the red band, a second a band of green light is scrolled across the face of the imaging light modulator. Immediately following the green band, a third band of blue light is scrolled across the face of the imaging light modulator. Each band of light covers less than approximately one-third of the imaging light modulator area. All three bands of light are directed to the imaging light modulator at the same time to simultaneously cover a large portion of the imaging light modulator area. After a band of one color completes a scan across the face of the imaging light modulator, a new band of the same color begins a new scan across the imaging light modulator starting from the opposite side and the sequence of events is repeated. Narrow dark regions between the wider colored bands allow for the imaging light modulator to be electrically readdressed with the correct image information for the subsequently scrolled color. Preferably, each rotating prism has a square cross-section.

The electrical addressing of the image information for each colored band that is scanned across the imaging light modulator can be done in progressive scan mode or interlaced scan mode. In progressive scan mode, all lines of the image are addressed in sequence to form one frame. In interlaced scan mode, only alternate lines of the image (such as the even numbered lines) are addressed in one scan. The other lines (in this case the odd numbered lines) are addressed in the subsequent scan. The interlaced scan mode can be used if the display electronics are too slow to address all lines in one scan. Preferably, progressive scan mode is used for color scrolling.

Projection display systems that incorporate color scrolling utilize three non-identical primary colors to form color images. Although not a requirement, in most displays the three primary colors are red (R), green (G) and blue (B). It is also possible to use the colors white (W), yellow (Y), cyan (C) and magenta (M) as additional colors in color scrolling projection displays. The projection display systems described below illustrate systems that utilize three colors. It is within the scope of this invention, however, that the color scrolling means may use more than three colors by either increasing the number of filter colors on the color filter wheel or increasing the number of prisms in the set of rotating prisms. In addition, the light source may require additional LEDs that emit the additional colors.

The imaging light modulator is located in the light optical path in a position following the color scrolling means.

Imaging light modulators spatially modulate an incoming partially collimated beam of light in order to form images. Imaging light modulators include, but are not limited to, devices such as liquid crystal display (LCD) devices, liquid-crystal-on-silicon (LCOS) devices and digital light processor (DLP) devices. LCD, LCOS and DLP devices are comprised of two-dimensional arrays of pixels, or picture elements, that can be individually controlled by electrical signals to form an image by varying the amount of light that each pixel transmits to a projection lens and subsequently to a viewing screen. The number of different light transmission levels that can be achieved for each pixel depends on the imaging light modulator design. For example, in some imaging light modulators, the number of light transmission levels that can be achieved for each pixel is 256. LCD and LCOS devices utilize liquid crystals, polarizing optical components and electronic driver circuits to individually control the amount of light transmission for each pixel. DLP devices utilize an array of micro-mirrors and associated electronic driver circuits to individually control the amount of light directed to a viewing screen by each pixel. DLP devices are not affected by the polarization state of the light and do not require polarizing optics.

In the embodiments of this invention that follow, the red, green and blue primary colors can each be generated by one of two methods. The color red, for example, can be generated directly by one or more red-emitting LEDs. However, a second way to generate red light is to coat one or more ultraviolet-emitting LEDs with a wavelength conversion layer that converts the ultraviolet light into red light. Similarly, the green and blue colors can be generated directly or can be generated by wavelength conversion using ultraviolet emitting LEDs and the appropriate wavelength conversion layers.

A full color image or frame can be formed in a projection display system by concurrently scrolling a red band of light, a green band of light and a blue band of light across an imaging light modulator to form a full-color frame in a frame time period $t_F$. The frame frequency $f_F$ or the number of frames imaged per second is given by the equation $$f_F = 1/t_F.$$ [Equation 2]

In order to form continuously changing images of a moving object that do not flicker, the frame frequency $f_F$ is typically 50 Hz or higher. In other words, each of the three colors is scanned across the imaging light modulator 50 times per second to generate 50 full-color frames every second. Full-color frame frequencies greater than 50 Hz (for example, 150 Hz or 180 Hz) may be required in order to form images of moving objects that do not exhibit flicker or color breakup. Color breakup is a stroboscopic effect in which the color images appear as flashes of light or bands of individual colors rather than continuous full color images. Color breakup can occur if an observer's eyes move rapidly from point to point on the projected image or color breakup can sometimes be seen in the peripheral vision of the observer's eyes.

As stated previously, it is also possible to use more than three colors to form a full color image or frame by color scrolling. For example, a full color image or frame can be formed in a five-color projection display system by concurrently scrolling a red band of light, a yellow band of light, a green band of light, a cyan band of light and a blue band of light across an imaging light modulator to form a full-color frame in a frame time period $t_F$.

Figure 4A:
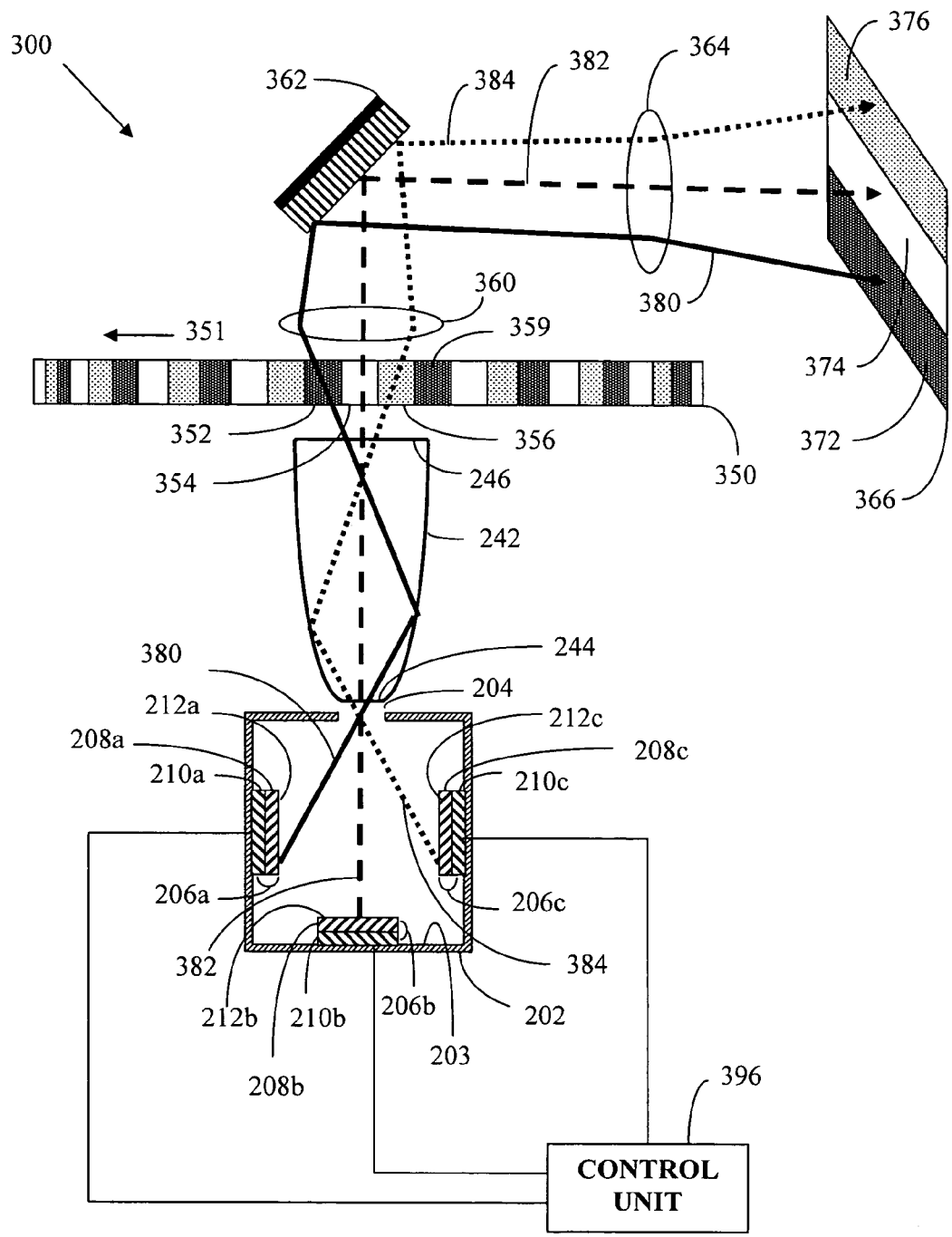
FIGS. 4A and 4B are cross-sectional views of an embodiment of this invention that incorporates a color scrolling means and an imaging light modulator.
Figure 4B:
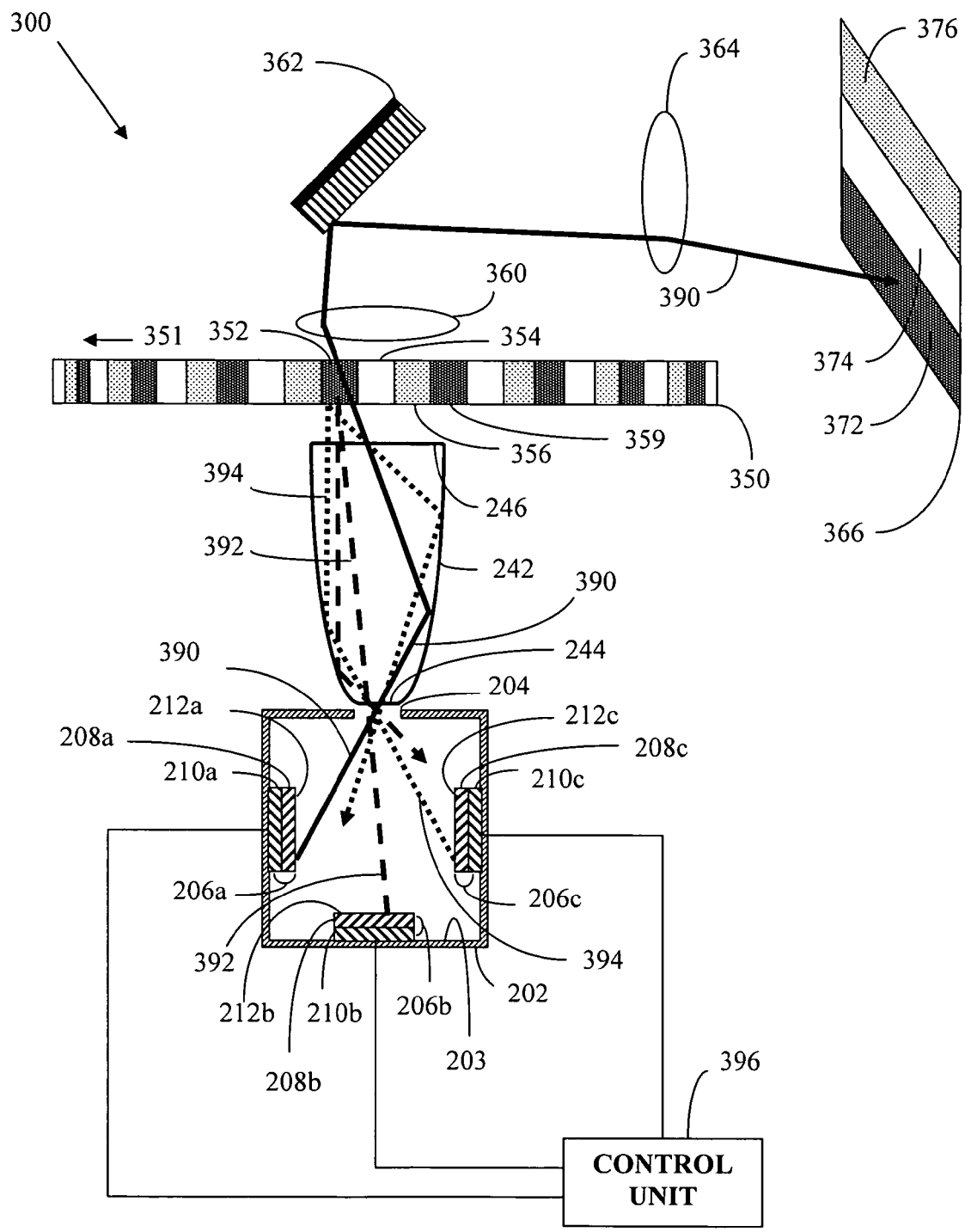

An embodiment of this invention is a projection display system 300 that utilizes a color scrolling means to form full-color images. Cross-sectional views of projection display system 300 are shown in FIGS. 4A and 4B. The projection display system 300 is comprised of a light-recycling illumination system, a color filter wheel 350, optional relay optics 360, an imaging light modulator 362, a projection lens 364 and a viewing screen 366.

The light-recycling illumination system is further comprised of at least three LEDs, which are labeled 206a, 206b and 206c, a light-recycling envelope 202, inside reflecting surfaces 203, a light-output aperture 204 and a light-collimating means 242. The characteristics and properties of the LEDs, the light-recycling envelope, the inside reflecting surfaces, the light-output aperture and the light collimating means have been described previously for FIGS. 3A–3D. In this example, LED 206a emits red light, LED 206b emit green light and LED 206c emits blue light. The three colors combine to form white light.

In FIGS. 4A and 4B, the area of the light-output aperture 204 is less than the total area of the light source, which is the three LEDs. In some cases, the maximum exiting luminance from the light-output aperture 204 greater than the respective maximum intrinsic source luminance.

The light output of the light-recycling illumination system is partially collimated white light. Preferably, the light-collimating means 242 partially collimates the white light so that the light output distribution is preferably within the angular range of −35 degrees to +35 degrees. More preferably, light-collimating means 242 partially collimates the white light so that the light output distribution is within the angular range of −25 degrees to +25 degrees. Most preferably, light-collimating means 242 partially collimates the light so that the light output distribution is within the angular range of −15 degrees to +15 degrees.

Figure 4C:
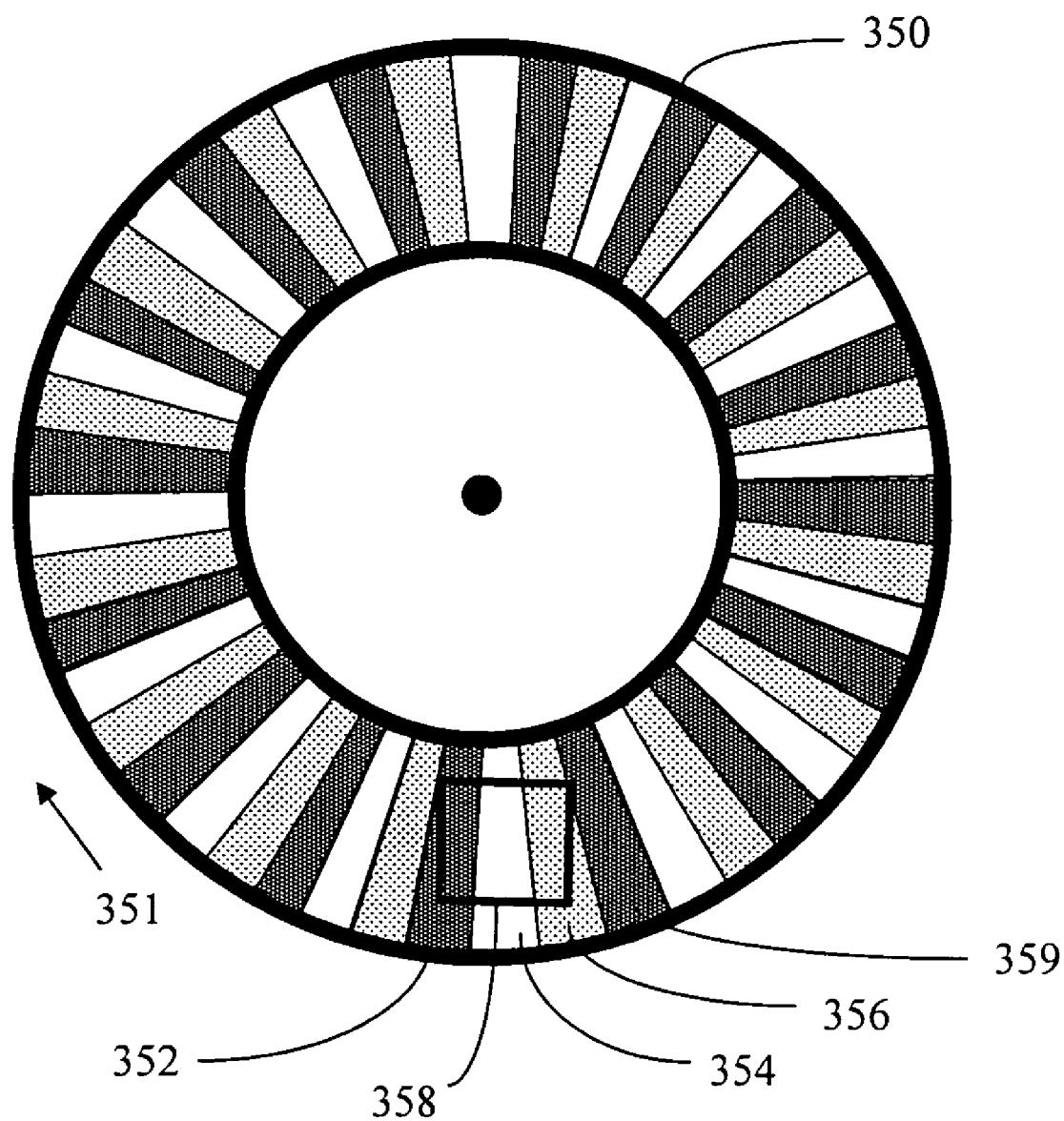
FIG. 4C is a plane view of a color filter wheel.

The partially collimated light output of the light-recycling illumination system exiting the output surface 246 is directed to the color scrolling means. In this embodiment, the color scrolling means is color filter wheel 350. Color filter wheel 350 is shown in edge view in FIGS. 4A and 4B and is shown in plane view in FIG. 4C. Color filter wheel 350 is comprised of a repeating series of three types of color filters that transmit red, green or blue light. In order to increase the overall efficiency of projection display system 300, light that is not transmitted by the color filters is reflected and recycled back into the light-recycling envelope 202 of the light-recycling illumination system. The recycled light that is returned to the light-recycling illumination system can be reflected and redirected out of the light-recycling illumination system to other filters of color filter wheel 350 and ultimately transmitted to the imaging light modulator. The recycled light can also reflect from the reflecting layers 210a, 210b and 210c of LEDs 206a, 206b and 206c, respectively, and thereby increase the effective brightness of the LEDs. Color filter 352 transmits red light and reflects green and blue light. Color filter 354 transmits green light and reflects red and blue light. Color filter 356 transmits blue light and reflects red and green light. The red, green and blue transmitting filters are repeated around the periphery of the wheel as shown in FIG. 4C. For simplicity of illustration, the red, green and blue transmitting filters are shown to be radially oriented relative to the center of the color filter wheel 350. It is also within the scope of this invention that the red, green and blue transmitting filters can be oriented in a spiral pattern radiating from the center of the color filter wheel. A spiral pattern is preferred over a radial pattern.

Light exiting the output surface 246 of the light-collimating means 242 is directed to at least three filters simultaneously on the color filter wheel 350. The three filters comprise a red filter, a green filter and a blue filter. The area 358 through which the light exiting the output surface 246 is directed is shown by the indicated rectangular outline in FIG. 4C. The area 358 is fixed in space and does not move with the color filter wheel 350. As the color filter wheel rotates in the direction of arrow 351, one filter color (for example, red filter 352) moves out of the area 358 and a corresponding filter of the same color (in this example, red filter 359) moves into the opposite side of the area 358. The red, green and blue filters thereby move sequentially across the area 358 and form bands of red, green and blue transmitted light that are sequentially scanned (scrolled) across the face of imaging light modulator 362.

Between the red, green and blue filters on filter wheel 350 are narrow black stripes that do not transmit light. During the time that the narrow black stripes scroll across the pixels of the imaging light modulator, the pixels under the black stripes are electrically addressed and reset to the proper transmission state for the subsequent color.

In FIGS. 4A and 4B, optional relay optics 360 is positioned between the color filter wheel and the imaging light modulator 362. Relay optics 360 is illustrated as a lens and may not be required for the proper functioning of the projection display system 300.

Light that passes through color filter wheel 350 is directed to imaging light modulator 362. Imaging light modulator 362 in FIGS. 4A and 4B is depicted as a DLP device. DLP devices are not polarization sensitive and do not require polarization optics. Alternatively, the imaging light modulator for projection display system 300 could be an LCD device or an LCOS device. LCD and LCOS devices require additional polarization optical components that are not shown in FIGS. 4A and 4B.

Projection lens 364 magnifies the image that is formed on the imaging light modulator and projects the magnified image onto a viewing screen 366. For simplicity, projection lens 364 is illustrated in FIGS. 4A and 4B as a single-element lens. However, projection lens 364 is usually a multi-element lens in most projection display systems.

Viewing screen 366 is any type of viewing surface onto which the image formed by the imaging light modulator is projected. The red, green and blue bands of light that are scanned by the color scrolling means across the imaging light modulator 362 will be transmitted by projection lens 364 and will also be scanned across the viewing screen 366. The bands of light scanned across the viewing screen will contain the respective red, green and blue image information formed by the imaging light modulator. The scanning frequency, $f_F$, must be set high enough so that an observer sees full color images on the viewing screen 366 and does not see the individual bands of red, green and blue light that occur in the scanning process.

A control unit 396 provides electrical power to LEDs 206a, 206b and 206c. The electrical power to each LED can be controlled individually. By changing the amount of electrical power transmitted to each LED, the ratio of the red, green and blue light emitted by the LEDs can be controlled and modified. By this method, the color balance and the resulting color temperature of the light exiting the light-recycling illumination system of projection display system 300 can be controlled and modified. This type of color balancing and color temperature control is not possible for illumination systems incorporating arc lamp light sources since the amounts of red, green and blue light emitted by an arc lamp source cannot be separately controlled.

The control unit 396 also allows for increasing or dimming the light output of the projection display system to adjust for day or night viewing or to adjust for changing ambient lighting conditions. To increase or dim the light output without changing the color balance, the light output from each LED is increased or reduced by the same percentage. Changing the light output of the LEDs can be done independently of the imaging light modulator so that the full grayscale of the imaging light modulator may be utilized under all ambient lighting conditions.

Six representative light rays are shown in FIGS. 4A and 4B to illustrate the operation of the projection display system 300. Although light rays emitted by the LEDs may make multiple reflections inside the light-recycling envelope 202 before exiting the light-output aperture 204, the multiple reflections are not shown in order to simplify the figures.

Each LED may emit light of a first polarization state or light of a second polarization state. The polarization states may be linear polarization states or circular polarization states. Since the imaging light modulator 362 in FIGS. 4A and 4B is a DLP device and is insensitive to polarization states, the polarization states of the six representative rays are not indicated in the figures.

Red (solid line) light ray 380 is emitted through surface 212a of emitting layer 208a of LED 206a. Red light ray 380 passes through the interior of light-recycling envelope 202, passes through light-output aperture 204 and enters input surface 244 of light-collimating means 242 as uncollimated light. Red light ray 380 is reflected by the sides of light-collimating means 242 and exits the light-collimating means 242 through the output surface 246 as partially collimated light. Red light ray 380 passes through color filter 352 of color filter wheel 350. Color filter 352 transmits red light and reflects green and blue light. Red light ray 380 then passes through relay optics 360 and is directed to a pixel of imaging light modulator 362. The pixel of imaging light modulator 362 forms one pixel of a red image by reflecting all or part of red light ray 380 to projection lens 364 and to viewing screen 366. Red light ray 380 strikes viewing screen 366 as part of the red band of light 372, which is being scrolled across the viewing screen 366 by color filter wheel 350.

Green (dashed line) light ray 382 is emitted through surface 212b of emitting layer 208b of LED 206b. Green light ray 382 passes through the interior of light-recycling envelope 202, passes through light-output aperture 204 and enters input surface 244 of light-collimating means 242 as uncollimated light. Green light ray 382 is partially collimated by light-collimating means 242 and exits the light-collimating means 242 through the output surface 246 as partially collimated light. Green light ray 382 passes through color filter 354 of color filter wheel 350. Color filter 354 transmits green light and reflects red and blue light. Green light ray 382 then passes through relay optics 360 and is directed to a pixel of imaging light modulator 362. The pixel of imaging light modulator 362 forms one pixel of a green image by reflecting all or part of green light ray 382 to projection lens 364 and to viewing screen 366. Green light ray 382 strikes viewing screen 366 as part of the green band of light 374, which is being scrolled across viewing screen 366 by color filter wheel 350.

Blue (dotted line) light ray 384 is emitted through surface 212c of emitting layer 208c of LED 206c. Blue light ray 384 passes through the interior of light-recycling envelope 202, passes through light-output aperture 204 and enters input surface 244 of light-collimating means 242 as uncollimated light. Blue light ray 384 is reflected by the sides of light-collimating means 242 and exits the light-collimating means 242 through the output surface 246 as partially collimated light. Blue light ray 384 passes through color filter 356 of color filter wheel 350. Color filter 356 trans its blue light and reflects red and green light. Blue light ray 384 then passes through relay optics 360 and is directed to a pixel of imaging light modulator 362. The pixel of imaging light modulator 362 forms one pixel of a blue image by reflecting all or part of blue light ray 384 to projection lens 364 and to viewing screen 366. Blue light ray 384 strikes viewing screen 366 as part of the blue band of light 376, which is being scrolled across viewing screen 366 by color filter wheel 350.

Three representative light rays in FIG. 4B illustrate the light recycling function of color filter 352 of color filter wheel 350. Color filter 352 transmits red light and reflects and recycles green and blue light. Note that color filters 354 and 356 also recycle light. Color filter 354 transmits green light and recycles red and blue light. Color filter 356 transmits blue light and recycles red and green light. To simplify the illustration, recycled light rays are not shown for color filters 354 and 356.

Red (solid line) light ray 390 is emitted through surface 212a of emitting layer 208a of LED 206a. Red light ray 390 passes through the interior of light-recycling envelope 202, passes through light-output aperture 204 and enters input surface 244 of light-collimating means 242 as uncollimated light. Red light ray 390 is reflected by the sides of light-collimating means 242 and exits the light-collimating means 242 through the output surface 246 as partially collimated light. Red light ray 390 passes through color filter 352 of color filter wheel 350. Color filter 352 transmits red light and reflects green and blue light. Red light ray 390 then passes through relay optics 360 and is directed to a pixel of imaging light modulator 362. The pixel of imaging light modulator 362 forms one pixel of a red image by reflecting all or part of red light ray 390 to projection lens 364 and to viewing screen 366. Red light ray 390 strikes viewing screen 366 as part of the red band of light 372, which is being scrolled across the viewing screen 366 by color filter wheel 350.

Green (dashed line) light ray 392 is emitted through surface 212b of emitting layer 208b of LED 206b. Green light ray 392 passes through the interior of light-recycling envelope 202, passes through light-output aperture 204 and enters input surface 244 of light-collimating means 242 as uncollimated light. Green light ray 392 is partially collimated by light-collimating means 242 and exits the light-collimating means 242 through the output surface 246 as partially collimated light. Green light ray 392 is reflected by color filter 352 of color filter wheel 350. Green light ray 392 is recycled back through light-collimating means 242 and back into light-recycling envelope 202. Green light ray 392 may reflect several times inside the light-recycling envelope 202. For example, the recycled green light ray 392 can reflect off the reflecting layers 210a, 210b and 210c of the LEDs, thereby increasing the effective brightness of the LEDs. The recycled green light ray 392 may again exit (not shown) the light-recycling envelope through output aperture 204, pass through light-collimating means 242 and again be directed to color filter wheel 350. If green light ray 392 is directed to color filter 354, which transmits green light, then green light ray 392 will be transmitted to imaging light modulator 362 and eventually to viewing screen 366 and thereby increase the brightness of projection display system 300.

Blue (dotted line) light ray 394 is emitted through surface 212c of emitting layer 208c of LED 206c. Blue light ray 394 passes through the interior of light-recycling envelope 202, passes through light-output aperture 204 and enters input surface 244 of light-collimating means 242 as uncollimated light. Blue light ray 394 is reflected by the sides of light-collimating means 242 and exits the light-collimating means 242 through the output surface 246 as partially collimated light. Blue light ray 394 is reflected by color filter 352 of color filter wheel 350. Blue light ray 394 is recycled back through light-collimating means 242 and back into light-recycling envelope 202. Blue light ray 394 may reflect several times inside the light-recycling envelope 202. For example, the recycled blue light ray 394 can reflect off the reflecting layers 210a, 210b and 210c of the LEDs, thereby increasing the effective brightness of the LEDs. The recycled blue light ray 394 may again exit (not shown) the light-recycling envelope through output aperture 204, pass through light-collimating means 242 and again be directed to color filter wheel 350. If blue light ray 394 is directed to color filter 356, which transmits blue light, then blue light ray 394 will be transmitted to imaging light modulator 362 and eventually to viewing screen 366 and thereby increase the brightness of projection display system 300.

Figure 5A:
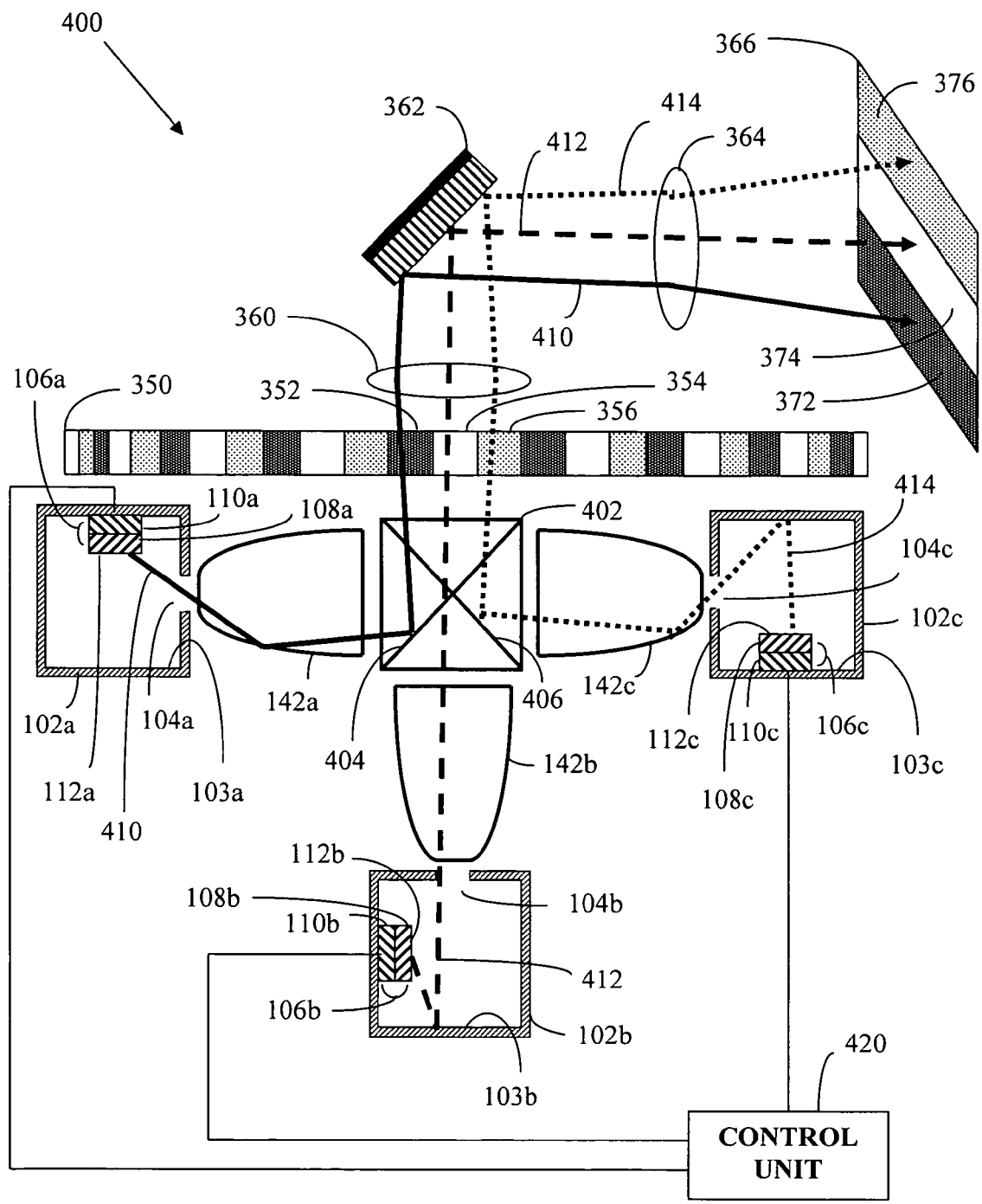
FIGS. 5A and 5B are cross-sectional views of an embodiment of this invention that incorporates a color scrolling means, a color-combining means and an imaging light modulator.
Figure 5B:
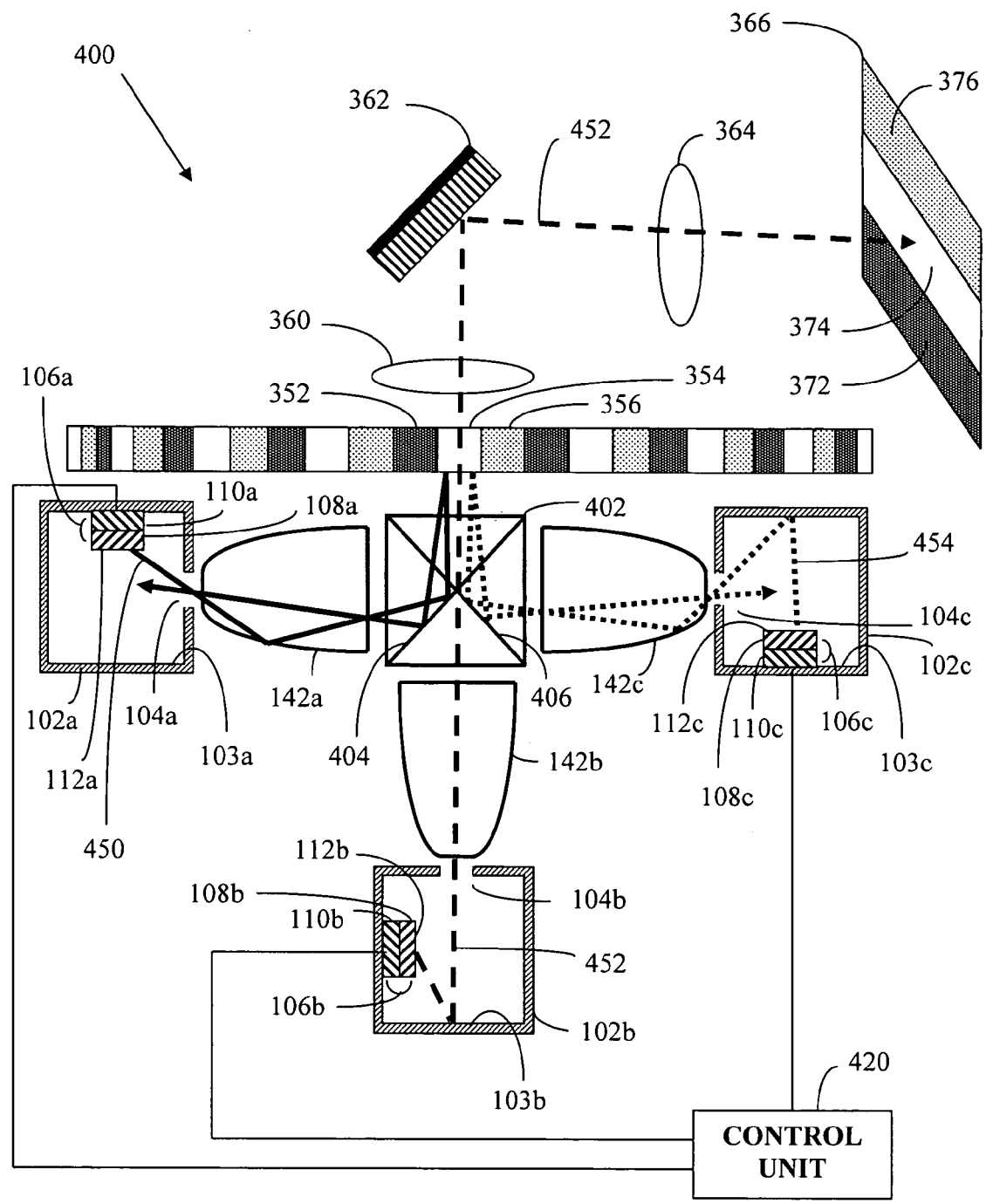

Another embodiment of this invention is projection display system 400 illustrated in FIGS. 5A and 5B. In FIGS. 5A and 5B, color filter wheel 350, relay optics 360, imaging light modulator 362, projection lens 364 and viewing screen 366 are identical to the elements in projection display system 300. However, the single light-recycling illumination system shown in projection display system 300 is replaced with three light-recycling illumination systems in projection display system 400. Projection display system 400 also requires a color-combining means to combine the light beams emitted by the three light-recycling illumination systems.

The three light-recycling illumination systems comprise, respectively, three LED light sources, three light-recycling envelopes 102a, 102b and 102c that have, respectively, inside reflecting surfaces 103a, 103b, and 103c, three light-output apertures 104a, 104b and 104c and three light-collimating means 142a, 142b and 142c. Light-recycling envelope 102a encloses red-emitting LED 106a, light-recycling envelope 102b encloses green-emitting LED 106b and light-recycling envelope 102c encloses blue-emitting LED 106c. The characteristics and properties of the LEDs, the light-recycling envelopes, the inside reflecting surfaces, the light-output apertures and the light-collimating means have been described previously in the descriptions for FIGS. 2A and 2B. For each of the three light-recycling illumination systems, the area of the light-output aperture 104a, 104b or 104c is less than the area of the respective light source and, in some cases, the maximum exiting luminance from the light-output aperture 104a, 104b or 104c is greater than the respective maximum intrinsic source luminance.

Although light-recycling envelope 102a is illustrated with one red LED, it is within the scope of this invention that light-recycling envelope 102a may enclose more than one red LED. Likewise, light-recycling envelope 102b may enclose more than one green LED and light-recycling envelope 102c may enclose more than one blue LED. It is also within the scope of this invention that red light may be produced inside light-recycling envelope 102a by one or more ultraviolet LEDs that are coated with a wavelength conversion material in order to convert ultraviolet light to red light. Green light and blue light may also be produced by wavelength conversion if desired.

It is also an embodiment of this invention that if a light-recycling envelope, such as light-recycling envelope 102b, encloses more than one green LED, the green LEDs may emit different wavelengths of green light. For example, multiple green LEDs may each emit a different wavelength in the 510-nm to 540-nm wavelength range. Using multiple green LEDs that emit different wavelengths of green light can increase the color gamut of the projection display system. Similarly, a light-recycling envelope that contains multiple red LEDs may utilize red LEDs that emit more than one wavelength of red light and a light-recycling envelope that contains multiple blue LEDs may utilize blue LEDs that emit more than one wavelength of blue light.

The imaging light modulator 362 in projection display system 400 is a DLP device. Because DLP devices are not polarization sensitive, polarizing elements are not required in projection display system 400. Alternatively, it is within the scope of this invention that the imaging light modulator may be an LCD device or an LCOS device. LCD and LCOS devices require additional polarization optical elements that are not shown in FIGS. 5A and 5B.

Because the red light, green light and blue light are generated in three separate light-recycling envelopes, a color-combining means is required to combine the resulting three light beams into one beam. Examples of color-combining means include, but are not limited to, an x-cube prism, a series of dichroic mirrors or a Philips prism. A Philips prism is a trichroic prism assembly comprising three prisms.

Figure 6:
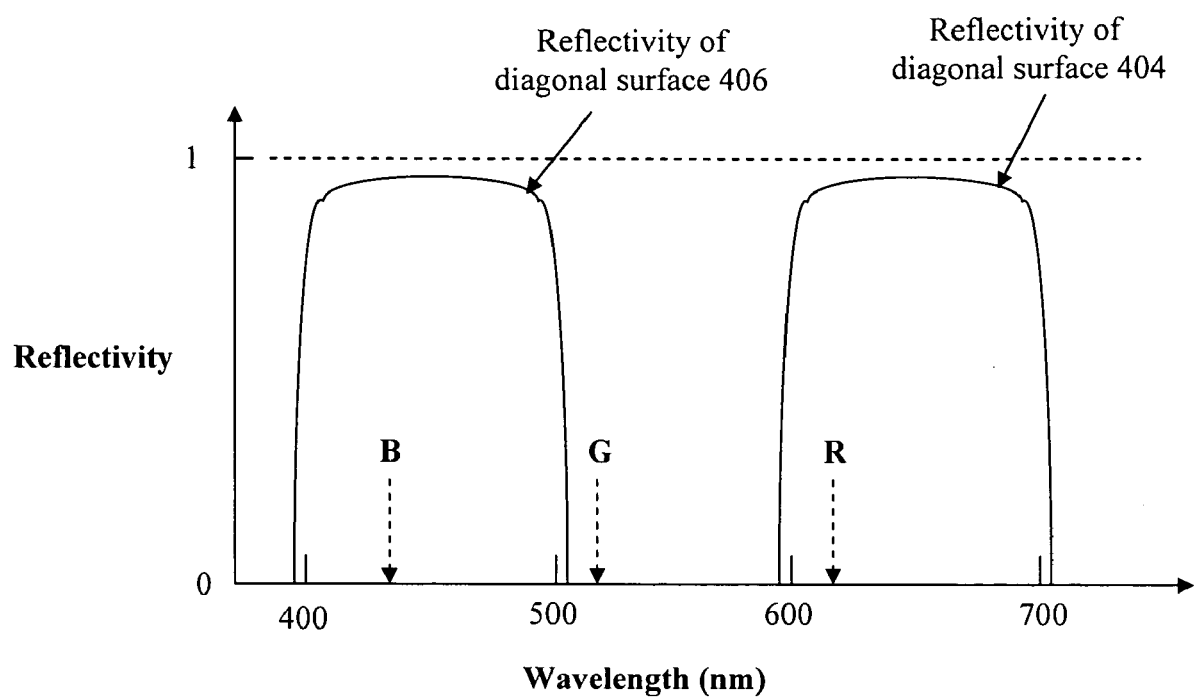
FIG. 6 is an example of the reflectivity of two diagonal surfaces of an x-cube prism.

In FIGS. 5A and 5B, the color-combining means is x-cube prism 402. The x-cube prism 402 has two partially reflecting diagonal surfaces. Examples of the approximate reflectivity of the diagonal surface 404 and the approximate reflectivity of the diagonal surface 406 are illustrated schematically in FIG. 6. The reflectivity curves in FIG. 6 are illustrative examples and are not meant to limit the reflectivity of the diagonal surface 404 and diagonal surface 406 to the illustrated wavelength dependences. Diagonal surface 404 reflects light having wavelengths between approximately 600-nm and approximately 700-nm and transmits light having wavelengths between approximately 400-nm and 600-nm. The 600-nm to 700-nm reflective range includes red light. Diagonal surface 406 reflects light having wavelengths between approximately 400-nm and approximately 500-nm and transmits light having wavelengths between approximately 500-nm and 700-nm. The 400-nm to 500-nm reflective range includes blue light. Diagonal surfaces 404 and 406 both transmit light between approximately 500-nm and 600-nm. The 500-nm to 600-nm range includes green light.

The control unit 420 in FIGS. 5A and 5B can control the electrical power to the LEDs 106a, 106b and 106c. By changing the amount of electrical power directed to each LED, the ratio of the red, green and blue light emitted by the LEDs can be controlled and modified. By this method, the color balance and the resulting color temperature of the light exiting the light-recycling illumination system of projection display system 400 can be modified. The control unit 420 also allows for increasing or dimming the light output of the projection display system to adjust for day or night viewing or to adjust for changing ambient lighting conditions. To increase or dim the light output without changing the color balance, the light output from each LED is simultaneously increased or reduced by the same percentage.

Six representative light rays are shown in FIGS. 5A and 5B to illustrate the operation of the projection display system 400. Although light rays emitted by the LEDs may make multiple reflections inside the light-recycling envelopes 102a, 102b and 102c before exiting the respective light-output apertures 104a, 104b and 104c, the multiple reflections are not shown in order to simplify the figures. Since the imaging light modulator 362 in FIGS. 5A and 5B is a DLP device and is insensitive to polarization states, the polarization states of the six representative rays are not indicated in the figures.

Red light ray 410 is emitted through surface 112a of emitting layer 108a of LED 106a. Red light ray 410 passes through the interior of light-recycling envelope 102a, passes through light-output aperture 104a and enters light-collimating means 142a as uncollimated light. Red light ray 410 is partially collimated by light-collimating means 142a and is directed to x-cube prism 402. Red light ray 410 is reflected by diagonal surface 404 and transmitted to color filter wheel 350. Red light ray 410 passes through color filter 352 of color filter wheel 350. Color filter 352 transmits red light and reflects green and blue light. Red light ray 410 then passes through optional relay optics 360 and is directed to a pixel of imaging light modulator 362. The pixel of imaging light modulator 362 forms one pixel of a red image by reflecting all or part of red light ray 410 to projection lens 364 and to viewing screen 366. Red light ray 410 strikes viewing screen 366 as part of the red band of light 372, which is being scrolled across the viewing screen 366 by color filter wheel 350.

Green light ray 412 is emitted through surface 112b of emitting layer 108b of LED 106b. Green light ray 412 passes through the interior of light-recycling envelope 102b, is reflected by the light-recycling envelope and passes through the interior of the light-recycling envelope a second time. Green light ray 412 passes through light-output aperture 104b and enters light-collimating means 142b as uncollimated light. Green light ray 412 is partially collimated by light-collimating means 142b and is directed to x-cube prism 402. Green light ray 412 is transmitted through x-cube prism 402 to color filter wheel 350. Green light ray 412 passes through color filter 354 of color filter wheel 350. Color filter 354 transmits green light and reflects red and blue light. Green light ray 412 then passes through relay optics 360 and is directed to a pixel of imaging light modulator 362. The pixel of imaging light modulator 362 forms one pixel of a green image by reflecting all or part of green light ray 412 to projection lens 364 and to viewing screen 366. Green light ray 412 strikes viewing screen 366 as part of the green band of light 374, which is being scrolled across viewing screen 366 by color filter wheel 350.

Blue light ray 414 is emitted through surface 112c of emitting layer 108c of LED 106c. Blue light ray 414 passes through the interior of light-recycling envelope 102c, is reflected by the light-recycling envelope 102c and passes through the light-recycling envelope a second time. Blue light ray 414 passes through light-output aperture 104c and enters light-collimating means 142c as uncollimated light. Blue light ray 414 is partially collimated by light-collimating means 142c and directed to x-cube prism 402. Blue light ray 414 is reflected by diagonal surface 406 of x-cube prism 402 and directed to color filter wheel 350. Blue light ray 414 passes through color filter 356 of color filter wheel 350. Color filter 356 transmits blue light and reflects red and green light. Blue light ray 414 then passes through optional relay optics 360 and is directed to a pixel of imaging light modulator 362. The pixel of imaging light modulator 362 forms one pixel of a blue image by reflecting all or part of blue light ray 414 to projection lens 364 and to viewing screen 366. Blue light ray 414 strikes viewing screen 366 as part of the blue band of light 376, which is being scrolled across viewing screen 366 by color filter wheel 350.

Three representative light rays in FIG. 5B illustrate the light recycling function of color filter 354 of color filter wheel 350. Color filter 354 transmits green light and reflects and recycles red and blue light. As note previously, color filters 352 and 356 also recycle light. To simplify the figures, recycled light rays are not shown for color filters 352 and 356.

Red light ray 450 is emitted through surface 112a of emitting layer 108a of LED 106a. Red light ray 450 passes through the interior of light-recycling envelope 102a, passes through light-output aperture 104a and enters light-collimating means 142a as uncollimated light. Red light ray 450 is reflected by the sides of light-collimating means 142a and exits light-collimating means 142a as partially collimated light. Red light ray 450 is reflected by diagonal surface 404 of x-cube prism 402 and is directed to color filter 354 of color filter wheel 350. Color filter 354 transmits green light and reflects red and blue light. Red light ray 450 is reflected by color filter 354 and is recycled back through x-cube prism 402 and light-collimating means 142a into light-recycling envelope 102a. Recycled red light ray 450 may reflect several times inside the light-recycling envelope 102a. For example, the recycled red light ray 450 can reflect off the reflecting layer 110a of LED 106a, thereby increasing the effective brightness of the LED 106a. The recycled red light ray 450 may again exit (not shown) the light-recycling envelope through output aperture 104a, pass through light-collimating means 142a and again be directed by x-cube prism 402 to color filter wheel 350. If red light ray 450 is directed to color filter 352, which transmits red light, then red light ray 450 will be transmitted to imaging light modulator 362 and eventually to viewing screen 366 and thereby increase the brightness of projection display system 400.

Green light ray 452 is emitted through surface 112b of emitting layer 108b of LED 106b. Green light ray 452 passes through the interior of light-recycling envelope 102b, is reflected by the interior surfaces of light-recycling envelope 102b, passes through the light-recycling envelope a second time and passes through light-output aperture 104b. Green light ray 452 is partially collimated by light-collimating means 142b and passes through x-cube prism 402 without reflection. Green light ray 450 passes through color filter 354 of color filter wheel 350. Green light ray 452 then passes through optional relay optics 360 and is directed to a pixel of imaging light modulator 362. The pixel of imaging light modulator 362 forms one pixel of a green image by reflecting all or part of green light ray 452 to projection lens 364 and to viewing screen 366. Green light ray 452 strikes viewing screen 366 as part of the green band of light 374, which is being scrolled across the viewing screen 366 by color filter wheel 350.

Blue light ray 454 is emitted through surface 112c of emitting layer 108c of LED 106c. Blue light ray 454 passes through the interior of light-recycling envelope 102c, is reflected by the interior surfaces of the light-recycling envelope 102c, passes through the interior of light-recycling envelope a second time and exits the light-output aperture 104c as uncollimated light. Blue light ray 454 is reflected by the sides of light-collimating means 142c and exits light-collimating means 142c as partially collimated light. Blue light ray 454 is reflected by diagonal surface 406 of x-cube prism 402 and is directed to color filter 354 of color filter wheel 350. Blue light ray 454 is reflected by color filter 354 of color filter wheel 350. Blue light ray 454 is recycled back through x-cube prism 402, back through light-collimating means 142c and back into light-recycling envelope 102c. Recycled blue light ray 454 may reflect several times inside the light-recycling envelope 102c. For example, the recycled blue light ray 454 can reflect off the reflecting layer 110c of LED 102c, thereby increasing the effective brightness of the LED 102c. The recycled blue light ray 454 may again exit (not shown) the light-recycling envelope through output aperture 104c, pass through light-collimating means 142c and again be directed by x-cube prism 402 to color filter wheel 350. If blue light ray 454 is directed to color filter 356, which transmits blue light, then blue light ray 454 will be transmitted to imaging light modulator 362 and eventually to viewing screen 366 and thereby increase the brightness of projection display system 400.

Figure 7:
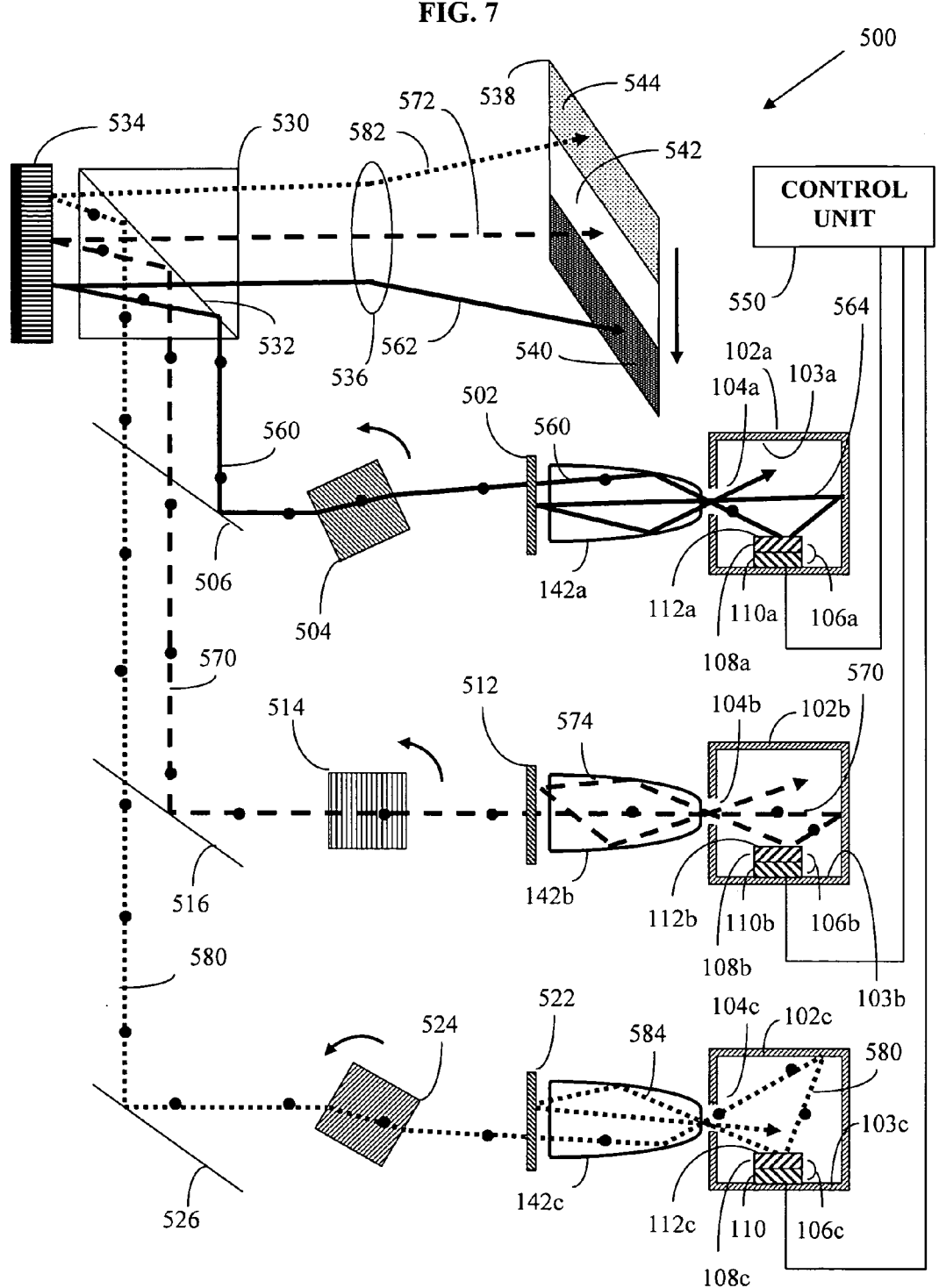
FIG. 7 is a cross-sectional view of another embodiment of this invention that incorporates a color scrolling means, a color-combining means and an imaging light modulator.
Figure 8:
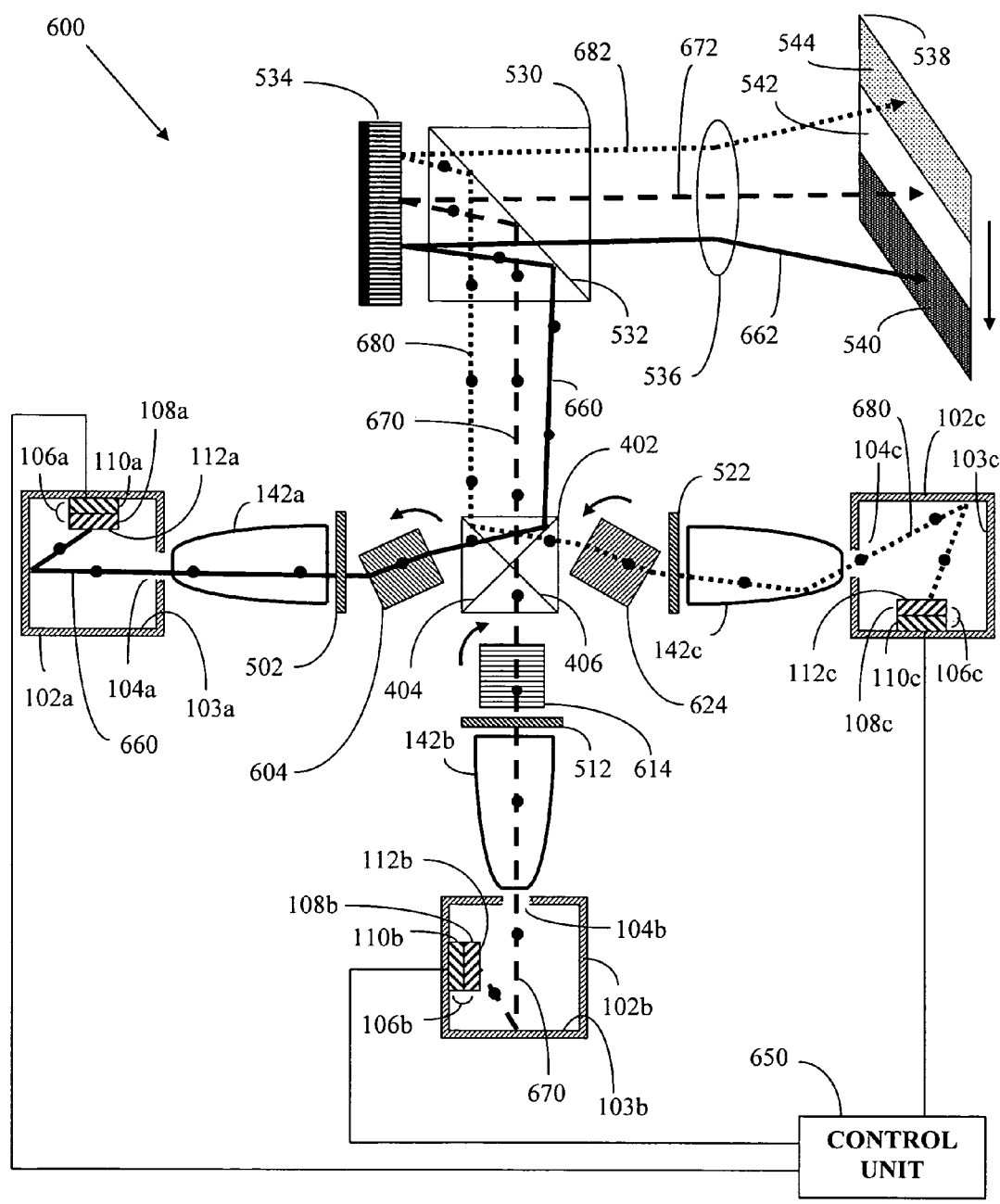
FIG. 8 is a cross-sectional view of another embodiment of this invention that incorporates a color scrolling means, a color-combining means and an imaging light modulator.

FIGS. 7 and 8 illustrate cross sectional views of embodiments of this invention that utilize a different type of color scrolling means. In FIGS. 7 and 8, three rotating prisms, along with the associated beam steering optics, comprise the color scrolling means. One rotating prism is required for each of the three projected colors. If the projection display system utilizes more than three colors, more than three prisms are required since the number of rotating prisms should be equal to the number of colors. The rotating prisms preferably have a square cross section.

The imaging light modulators in FIGS. 7 and 8 can be DLP devices, LCD devices, LCOS devices or any other type of appropriate image forming modulator. The imaging light modulator 534 in FIGS. 7 and 8 is shown, for illustrative purposes, to be an LCOS device. An LCOS device utilizes liquid crystals to modulate the light reflectivity of a two-dimensional array of pixels. LCOS devices are sensitive to the polarization state of the impinging light and require additional polarization optics to efficiently accomplish their function.

Projection display system 500 in FIG. 7 is comprised of three light-recycling illumination systems, three reflective polarizers 502, 512 and 522, three rotating prisms 504, 514 and 524, color combining mirrors 506, 516 and 526, a beam-splitting prism polarizer 530, an imaging light modulator 534, a projection lens 536, a viewing screen 538 and a control unit 550. There is one light-recycling illumination system and one rotating prism for each of three colors. Preferably the three colors are red, green and blue.

The light-recycling illumination systems are each further comprised of at least one LED, a light-recycling envelope having inside reflecting surfaces, a light-output aperture and a light-collimating means. LED 106a located inside light-recycling envelope 102a emits red light. LED 106b located inside light-recycling envelope 102b emits green light. LED 106c located inside light-recycling envelope 102c emits blue light. The characteristics and properties of LEDs 106a, 106b and 106c, light-recycling envelopes 102a, 102b and 102c, the inside reflecting surfaces 103a, 103b and 103c, light-output apertures 104a, 104b and 104c and the light-collimating means 142a, 142b and 142c have been described previously for FIGS. 2A and 2B. For each of the three light-recycling illumination systems, the area of the light-output aperture 104a, 104b or 104c is less than the area of the respective light source and, in some cases, the maximum exiting luminance from the light-output aperture 104a, 104b or 104c is greater than the respective maximum intrinsic source luminance of the respective light source.

Preferably the light-output apertures 104a, 104b and 104c as well as the light-collimating means 142a, 142b and 142c are designed so that the light exiting each light-collimating means is formed into a rectangular band of light. In order to generate the rectangular band shapes, preferably the light-output apertures 104a, 104b and 104c are rectangular is shape. When directed onto the imaging light modulator 534, each rectangular band of light illuminates approximately one-third or less of the imaging light modulator 534.

The reflective polarizers 502, 512 and 522 can be any type of polarizer that transmits light of a first polarization state and reflects light of a second polarization state. The reflective polarizers can be, for example, beam-splitting prism polarizers or planar reflective polarizers. The reflective polarizers illustrated in FIG. 7 are planar reflective polarizers. Examples of suitable planar reflective polarizers are polarizers made by NanoOpto Corporation and Moxtek Incorporated that utilize subwavelength optical elements or wire-grid optical elements.

The rotation motion of rotating prisms 504, 514 and 524 causes a time-varying displacement of the positions of the rectangular red, green and blue beams emitted by the light-recycling illumination systems. As a result, each rectangular beam is sequentially scanned across the face of the imaging light modulator 534. Each band of color covers less than approximately one-third of the imaging light modulator area. All three bands of light are directed to the imaging light modulator at the same time to simultaneously cover a large portion of the imaging light modulator area. After a band of one color completes a scan across the face of the imaging light modulator, a new band of the same color begins a new scan across the imaging light modulator starting from the opposite side and the sequence of events is repeated. Narrow dark regions between the wider colored bands allow for the imaging light modulator to be readdressed with the correct image information for the subsequently scrolled color.

The mirrors 506, 516 and 526 provide a color-combining means to combine the separate optical paths coming from rotating prisms 504, 514 and 524 into one optical path directed toward beam-splitting prism polarizer 530. Mirror 506 is a dichroic mirror that reflects red light and transmits green and blue light. Mirror 516 is a dichroic mirror that reflects green light and transmits blue light. Mirror 526 reflects blue light.

Preferably light of a single polarization state is directed to the imaging light modulator 534, which is an LCOS device. In FIG. 7, reflective polarizers 502, 512 and 522 direct light of a first polarization stage to beam-splitting prism polarizer 530 via rotating prisms 504, 514 and 524 and via mirrors 506, 516 and 526. Beam-splitting prism polarizer 530 incorporates a diagonal surface 532 that reflects light of a first polarization state to the imaging light modulator 534 and transmits light of a second polarization state. To form an image, each pixel of the imaging light modulator converts a portion of the light of a first polarization state into light of a second polarization state. The portion will vary for each pixel. The converted light of a second polarization state is then transmitted as an image through the beam-splitting prism polarizer and through the projection lens to the viewing screen.

As in previous embodiments, there is a control unit that manages the amount of electrical power directed to each LED. The control unit 550 in FIG. 7 can control the electrical power to the LEDs 106a, 106b and 106c. By changing the amount of electrical power transmitted to each LED, the ratio of the red, green and blue light emitted by the LEDs can be controlled and modified. By this method, the color balance and color temperature of the light exiting the light-recycling illumination systems of projection display system 500 can be modified. The control unit 550 also allows for increasing or dimming the light output of the projection display system to adjust for day or night viewing or to adjust for changing ambient lighting conditions. To increase or dim the light output without changing the color balance, the light output from each LED is increased or reduced by the same percentage.

Representative light rays 560, 564, 570, 574, 580 and 584 in FIG. 7 illustrate the operation of projection display system 500. In order to represent light of three colors and two polarization states in FIG. 7 and in the subsequent FIG. 8, the following conventions are used. A red light ray of a first polarization state is represented as a solid line with superimposed dots. A red light ray of a second polarization state is represented as a solid line. A green light ray of a first polarization state is represented as a dashed line with superimposed dots. A green light ray of a second polarization state is represented as a dashed line. A blue light ray of a first polarization state is represented as a dotted line with superimposed dots. Finally, a blue light ray of a second polarization state is represented as a dotted line.

Red light ray 560 of a first polarization state is emitted through surface 112a of LED 106a. Red light ray 560 of a first polarization state passes through light-recycling envelope 102a, exits through light-output aperture 104a and is partially collimated by light-collimating means 142a. Red light ray 560 of a first polarization state is transmitted by reflective polarizer 502, is spatially scrolled by rotating prism 504, is reflected by dichroic mirror 506 and is directed to beam-splitting prism polarizer 530. Diagonal surface 532 of beam-splitting prism polarizer 530 reflects red light ray 560 of a first polarization state to a pixel of imaging light modulator 534. The pixel of the imaging light modulator converts all or a portion of red light ray 560 of a first polarization state into red light ray 562 of a second polarization state. Red light ray 562 of a second polarization state is then transmitted through the beam-splitting prism polarizer 530 and through the projection lens 536 to viewing screen 538. Red light ray 562 of a second polarization state is part of red band 540 that is scrolled across viewing screen 538.

Red light ray 564 of a second polarization state is emitted through surface 112a of LED 106a. Red light ray 564 of a second polarization state passes through the interior of light-recycling envelope 102a, is reflected by an inside surface of light-recycling envelope 102a, passes through light-recycling envelope 102a a second time and exits through light output aperture 104a. Red light ray 564 of a second polarization state is partially collimated by light-collimating means 142a and directed to reflective polarizer 502. Reflective polarizer 502 reflects and recycles red light ray 564 of a second polarization state back through light-collimating means 142a and back into the light-recycling envelope 102a. Recycling red light ray 564 of a second polarization state can reflect multiple times inside light-recycling envelope 102a and be partially or fully converted into red light of a first polarization state. Light converted to a first polarization state can then exit light-output aperture 104a, be partially collimated by light-collimating means 142a and can pass through reflective polarizer 502. Such recycled and converted light can increase the output luminance of projection displays system 500.

Green light ray 570 of a first polarization state is emitted through surface 112b of LED 106b. Green light ray 570 of a first polarization state passes through light-recycling envelope 102b, is reflected by an inside surface of light-recycling envelope 102b, passes through light recycling envelope 102b a second time and exits through light-output aperture 104b. Green light ray 570 of a first polarization state is partially collimated by light-collimating means 142b and is directed to reflective polarizer 512. Green light ray 570 of a first polarization state is transmitted by reflective polarizer 512, is spatially scrolled by rotating prism 514, is reflected by dichroic mirror 516, passes through dichroic mirror 506 and is directed to beam-splitting prism polarizer 530. Diagonal surface 532 of beam-splitting prism polarizer 530 reflects green light ray 570 of a first polarization state to a pixel of the imaging light modulator 534. The pixel of the imaging light modulator converts all or a portion of green light ray 570 of a first polarization state into green light ray 572 of a second polarization state. Green light ray 572 of a second polarization state is then transmitted through the beam-splitting prism polarizer 530 and through the projection lens 536 to viewing screen 538. Green light ray 572 of a second polarization state is part of green band 542 that is scrolled across viewing screen 538.

Green light ray 574 of a second polarization state is emitted through surface 112b of LED 106b. Green light ray 574 of a second polarization state passes through the interior of light-recycling envelope 102b and exits through light output aperture 104b. Green light ray 574 of a second polarization state is partially collimated by light-collimating means 142b and directed to reflective polarizer 512. Reflective polarizer 512 reflects and recycles green light ray 574 of a second polarization state back through light-collimating means 142b and back into the light-recycling envelope 102b. Recycling green light ray 574 of a second polarization state can reflect multiple times inside light-recycling envelope 102b and be partially or fully converted into green light of a first polarization state. Light converted to a first polarization state can then exit light-output aperture 104b, be partially collimated by light-collimating means 142b and can pass through reflective polarizer 512. Such recycled and converted light can increase the output luminance of projection displays system 500.

Blue light ray 580 of a first polarization state is emitted through surface 112c of LED 106c. Blue light ray 580 of a first polarization state passes through light-recycling envelope 102c, is reflected by an inside surface of light-recycling envelope 102c, passes through light-recycling envelope 102c a second time and exits through light-output aperture 104c. Blue light ray 580 of a first polarization state is partially collimated by light-collimating means 142c and directed to reflective polarizer 522. Blue light ray 580 of a first polarization state is transmitted by reflective polarizer 522, is spatially scrolled by rotating prism 524, is reflected by mirror 526 and is directed through dichroic mirrors 516 and 506 to beam-splitting prism polarizer 530. Diagonal surface 532 of beam-splitting prism polarizer 530 reflects blue light ray 580 of a first polarization state to a pixel of imaging light modulator 534. The pixel of the imaging light modulator converts all or a portion of blue light ray 580 of a first polarization state into blue light ray 582 of a second polarization state. Blue light ray 582 of a second polarization state is then transmitted through the beam-splitting prism polarizer 530 and through the projection lens 536 to viewing screen 538. Blue light ray 582 of a second polarization state is part of blue band 544 that is scrolled across viewing screen 538.

Blue light ray 584 of a second polarization state is emitted through surface 112c of LED 106c. Blue light ray 584 of a second polarization state passes through the interior of light-recycling envelope 102c and exits through light output aperture 104c. Blue light ray 584 of a second polarization state is partially collimated by light-collimating means 142c and directed to reflective polarizer 522. Reflective polarizer 522 reflects and recycles blue light ray 584 of a second polarization state back through light-collimating means 142c and back into the light-recycling envelope 102c. Recycling blue light ray 584 of a second polarization state can reflect multiple times inside light-recycling envelope 102c and be partially or fully converted into blue light of a first polarization state. Light converted to a first polarization state can then exit light-output aperture 104c, be partially collimated by light-collimating means 142c and can pass through reflective polarizer 522. Such recycled and converted light can increase the output luminance of projection displays system 500.

Another embodiment of this invention is projection display system 600 shown in cross section in FIG. 8. Projection display system 600 is similar to projection display system 500 shown in FIG. 7 except that the color combining means has been changed from the group of three mirrors 506, 516 and 526 in FIG. 7 to an x-cube prism 402 in FIG. 8. The characteristics and properties of x-cube prism 402 were described previously in the explanations for FIGS. 5A, 5B and 6.

Projection display system 600 is comprised of three light-recycling illumination systems, three reflective polarizers 502, 512 and 522, three rotating prisms 604, 614 and 624, x-cube prism 402, beam-splitting prism polarizer 530, imaging light modulator 534, projection lens 536, viewing screen 538 and control unit 650. The characteristics and properties of beam-splitting prism polarizer 530, imaging light modulator 534, projection lens 536 and viewing screen 538 were described in the explanation for FIG. 7. In particular, imaging light modulator is assumed, for illustrative purposes, to be an LCOS device. The characteristics and properties of the rotating prisms 604, 614 and 624 are identical to the rotating prisms 504, 514 and 524 in FIG. 7.

As in previous embodiments, there is a control unit that manages the amount of electrical power directed to each LED. The control unit 650 in FIG. 8 can control the electrical power to the LEDs 106a, 106b and 106c. By changing the amount of electrical power transmitted to each LED, the color balance, the color temperature and the exiting luminance of the light exiting the light-recycling illumination systems of projection display system 500 can be modified.

The light-recycling illumination systems further comprise LEDs 106a, 106b and 106c, light-recycling envelopes 102a, 102b and 102c, inside reflecting surfaces 103a, 103b and 103c, light-output apertures 104a, 104b and 104c and light-collimating means 142a, 142b and 142c. The characteristics and properties of LEDs 106a, 106b and 106c, light-recycling envelopes 102a, 102b and 102c, inside reflecting surfaces 103a, 103b and 103c, light-output apertures 104a, 104b and 104c and the light-collimating means 142a, 142b and 142c have been described previously for FIGS. 2A and 2B. For each of the three light-recycling illumination systems, the area of the light-output aperture 104a, 104b or 104c is less than the area of the respective light source and, in some cases, the maximum exiting luminance from the light-output aperture 104a, 104b or 104c is greater than the respective maximum intrinsic source luminance of the respective light source.

Representative light rays 660, 662, 670, 672, 680 and 682 illustrate the operation of projection display system 600. The LEDs 106a, 106b and 106c are shown to emit light rays of a first polarization state. The LEDs also emit light rays of a second polarization state (as in FIG. 7 but not shown in FIG. 8) that can be reflected and recycled by reflective polarizers 502, 512 and 522.

Red light ray 660 of a first polarization state is emitted through surface 112a of LED 106a. Red light ray 660 of a first polarization state passes through light-recycling envelope 102a, is reflected by an interior surface of light-recycling envelope 102a, passes through light-recycling envelope a second time and exits through light-output aperture 104a. Red light ray 660 of a first polarization state is partially collimated by light-collimating means 142a and is directed to reflective polarizer 502. Red light ray 660 of a first polarization state is transmitted by reflective polarizer 502, is spatially scrolled by rotating prism 604, is reflected by diagonal surface 404 of x-cube prism 402 and is directed to beam-splitting prism polarizer 530. Diagonal surface 532 of beam-splitting prism polarizer 530 reflects red light ray 660 of a first polarization state to a pixel of imaging light modulator 534. The pixel of the imaging light modulator converts all or a portion of red light ray 660 of a first polarization state into red light ray 662 of a second polarization state. Red light ray 662 of a second polarization state is then transmitted through the beam-splitting prism polarizer 530 and through the projection lens 536 to viewing screen 538. Red light ray 662 of a second polarization state is part of red band 540 that is scrolled across viewing screen 538.

Green light ray 670 of a first polarization state is emitted through surface 112b of LED 106b. Green light ray 670 of a first polarization state passes through light-recycling envelope 102b, is reflected by an inside surface of light-recycling envelope 102b, passes through light recycling envelope 102b a second time and exits through light-output aperture 104b. Green light ray 670 of a first polarization state is partially collimated by light-collimating means 142b and is directed to reflective polarizer 512. Green light ray 670 of a first polarization state is transmitted by reflective polarizer 512, is spatially scrolled by rotating prism 614, is transmitted through x-cube prism 402 and is directed to beam-splitting prism polarizer 530. Diagonal surface 532 of beam-splitting prism polarizer 530 reflects green light ray 670 of a first polarization state to a pixel of imaging light modulator 534. The pixel of the imaging light modulator converts all or a portion of green light ray 670 of a first polarization state into green light ray 672 of a second polarization state. Green light ray 672 of a second polarization state is then transmitted through the beam-splitting prism polarizer 530 and through the projection lens 536 to viewing screen 538. Green light ray 672 of a second polarization state is part of green band 542 that is scrolled across viewing screen 538.

Blue light ray 680 of a first polarization state is emitted through surface 112c of LED 106c. Blue light ray 680 of a first polarization state passes through light-recycling envelope 102c, is reflected by an inside surface of light-recycling envelope 102c, passes through light-recycling envelope 102c a second time and exits through light-output aperture 104c. Blue light ray 680 of a first polarization state is partially collimated by light-collimating means 142c and is directed to reflective polarizer 522. Blue light ray 680 of a first polarization state is transmitted by reflective polarizer 522, is spatially scrolled by rotating prism 624, is reflected by diagonal surface 406 of x-cube prism 402 and is directed to beam-splitting prism polarizer 530. Diagonal surface 532 of beam-splitting prism polarizer 530 reflects blue light ray 680 of a first polarization state to a pixel of imaging light modulator 534. The pixel of the imaging light modulator converts all or a portion of blue light ray 680 of a first polarization state into blue light ray 682 of a second polarization state. Blue light ray 682 of a second polarization state is then transmitted through the beam-splitting prism polarizer 530 and through the projection lens 536 to viewing screen 538. Blue light ray 682 of a second polarization state is part of blue band 544 that is scrolled across viewing screen 538.

While the invention has been described in conjunction with specific embodiments and examples, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A projection display system, comprising:
    a light-recycling illumination system, further comprising:
        a light source for generating light, wherein said light source is at least one light-emitting diode having a reflecting layer, wherein the total light-emitting area of said light source is area $A_S$ and wherein said light source has a maximum intrinsic source luminance;
        a light-recycling envelope, wherein said light-recycling envelope encloses said light source and wherein said light-recycling envelope reflects and recycles a portion of said light generated by said light source back to said reflecting layer;
        a light output aperture, wherein said light output aperture is located in a surface of said light-recycling envelope, wherein the area of said light output aperture is area $A_O$, wherein said area $A_O$ is less than said area $A_S$, wherein said light source and said light-recycling envelope direct at least a fraction of said light out of said light-recycling envelope through said light output aperture and wherein said fraction of said light exits said light output aperture as uncollimated light having a maximum exiting luminance;
        a light-collimating means, wherein said light-collimating means has an input surface that is adjacent to said light output aperture that accepts said uncollimated light, wherein said light-collimating means partially collimates said uncollimated light and wherein said light-collimating means has an output surface through which the partially collimated light is transmitted;
    a color scrolling means to scan said partially collimated light, wherein said color scrolling means is located in the light optical path of said partially collimated light exiting said light-collimating means; and
    an imaging light modulator, wherein said imaging light modulator is located in said light optical path in a position following said color scrolling means, and wherein said imaging light modulator spatially modulates the scanned said partially collimated light to form an image that is projected onto a viewing screen.

2. A projection display system as in claim 1, wherein said maximum exiting luminance exiting said light-output aperture is greater than said maximum intrinsic source luminance.

3. A projection display system as in claim 2, wherein said light-collimating means is chosen from the group consisting of a convex lens, a tapered light guide and a compound parabolic reflector.

4. A projection display system as in claim 3, further comprising a reflective polarizer, wherein said reflective polarizer is located in the optical path of said partially collimated light and is located adjacent to said output surface of said light-collimating means, wherein said reflective polarizer transmits a first polarization state of said partially collimated light and wherein said reflective polarizer reflects a second polarization state of said partially collimated light.

5. A projection display system as in claim 3, wherein said color scrolling means is chosen from the group consisting of a color scrolling wheel and a plurality of rotating prisms.

6. A projection display system as in claim 5, wherein said imaging light modulator is chosen from the group consisting of a liquid crystal display device, a liquid-crystal-on-silicon device and a digital light processor device.

7. A projection display system as in claim 6, further comprising a projection lens, wherein said projection lens is located in the optical path in a position after said imaging light modulator, wherein said projection lens magnifies said image formed by said imaging light modulator and wherein said projection lens projects said image onto said viewing screen.

8. A projection display system as in claim 7, wherein said light source is a plurality of light-emitting diodes.

9. A projection display system as in claim 8, wherein said light source emits red light, green light and blue light.

10. A projection display system as in claim 8, wherein said light source comprises at least one light-emitting diode that emits ultraviolet light and wherein said light source further comprises a wavelength conversion layer that converts said ultraviolet light into said red light or said green light or said blue light.

11. A projection display system as in claim 8, wherein said light-recycling illumination system emits red light and wherein said projection display system further comprises a second light-recycling illumination system that emits said green light and a third light-recycling illumination system that emits said blue light.

12. A projection display system as in claim 11, further comprising a color combining means.

13. A projection display system as in claim 12, wherein said color combining means is chosen from the group consisting of an x-cube prism, a series of dichroic mirrors or a Philips prism.

14. A projection display system as in claim 13, further comprising a control unit to individually control the light output of said red light, said green light and said blue light in order to modify the color balance and the color temperature of said projection display system or to increase or dim the brightness of said projection display system.

* * * * *